(12) United States Patent
Park et al.

(10) Patent No.: US 9,497,446 B2
(45) Date of Patent: Nov. 15, 2016

(54) METHOD OF DISPLAYING STEREOSCOPIC IMAGE AND DISPLAY APPARATUS FOR PERFORMING THE SAME

(75) Inventors: Bong-Im Park, Asan-si (KR);
Byoung-Jun Lee, Cheonan-si (KR);
Yun-Jae Kim, Asan-si (KR); Seon-Ki Kim, Anyang-si (KR); Se-Huhn Hur, Yongin-si (KR); Jae-Woo Jung, Cheonan-si (KR); Jun-Pyo Lee, Asan-si (KR); Ah-Reum Kim, Seoul (KR);
Ik-Huyn Ahn, Asan-si (KR);
Kang-Min Kim, Seoul (KR);
Jung-Won Kim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 1169 days.

(21) Appl. No.: 13/306,563

(22) Filed: Nov. 29, 2011

(65) Prior Publication Data

US 2012/0147162 A1 Jun. 14, 2012

(30) Foreign Application Priority Data

Dec. 10, 2010 (KR) .............. 2010-0126194

(51) Int. Cl.
*H04N 15/00* (2006.01)
*H04N 13/04* (2006.01)
(52) U.S. Cl.
CPC ...... *H04N 13/0422* (2013.01); *H04N 13/0431* (2013.01); *H04N 13/0438* (2013.01)
(58) Field of Classification Search
CPC ............. H04N 13/04; H04N 13/0422; H04N 13/0431; H04N 13/0429
See application file for complete search history.

(56) References Cited

U.S. PATENT DOCUMENTS 5,074,645 A 12/1991 Gold et al.
6,608,614 B1 * 8/2003 Johnson .............. G02B 6/0043
345/102

(Continued)

FOREIGN PATENT DOCUMENTS

JP  2002-365593  12/2002
JP  2010-122345  6/2010
KR 1020080105873 12/2008

OTHER PUBLICATIONS

Joo BY, Shin DH. Design guidance of backlight optic for improvement of the brightness in the conventional edge-lit LCD backlight. Displays. Apr. 30, 2010;31(2):87-92.*

(Continued)

*Primary Examiner* — Sath V Perungavoor
*Assistant Examiner* — Clifford Hilaire
(74) *Attorney, Agent, or Firm* — F. Chau & Associates, LLC

(57) ABSTRACT

A method of displaying a stereoscopic image provides first light having a first wavelength and second light having a second wavelength different from the first wavelength to the a display panel according to left-eye and right-eye images displayed on the display panel. Color correcting data are generated by correcting at least one of left-eye color data corresponding to the left-eye image and right-eye color data corresponding to the right-eye image such that a first color coordinate according to the first light and a second color coordinate according to the second light coincide with each other with respect to the same color. The left-eye and right-eye images are displayed using light having wavelengths different from each other, so that a display quality of the stereoscopic image may be enhanced.

18 Claims, 25 Drawing Sheets

(56) References Cited

U.S. PATENT DOCUMENTS

| | | |
|---|---|---|
| 8,274,557 B2 | 9/2012 | Tomita |
| 2003/0147110 A1* | 8/2003 | Barton ................. H04N 1/6086 358/509 |
| 2008/0204779 A1* | 8/2008 | Koyama ............... G06T 11/001 358/1.9 |
| 2008/0278807 A1 | 11/2008 | Richards et al. |
| 2010/0060857 A1* | 3/2010 | Richards ................ G02B 5/285 353/7 |
| 2010/0123773 A1* | 5/2010 | Tomita ............... H04N 13/0422 348/54 |
| 2010/0302353 A1* | 12/2010 | Lee .................... H04N 13/0434 348/58 |
| 2011/0074937 A1* | 3/2011 | Nakahata ............... H04N 13/00 348/56 |
| 2011/0122238 A1* | 5/2011 | Hulvey .............. H04N 13/0438 348/56 |
| 2011/0128287 A1* | 6/2011 | Lee et al. ...................... 345/426 |
| 2011/0273439 A1* | 11/2011 | Son et al. ..................... 345/419 |
| 2012/0162400 A1* | 6/2012 | Iwanaka ............ G02B 27/2264 348/54 |
| 2014/0125764 A1* | 5/2014 | Demas et al. .................. 348/43 |

OTHER PUBLICATIONS

Korean Office Action Dated Aug. 9, 2016.

\* cited by examiner

LUT2 (IN CASE OF 5X5X5-SIZE)

METHOD OF DISPLAYING STEREOSCOPIC IMAGE AND DISPLAY APPARATUS FOR PERFORMING THE SAME

CROSS-REFERENCE TO RELATED APPLICATION

This application claims priority under 35 U.S.C. §119 to Korean Patent Application No. 2010-126194, filed on Dec. 10, 2010 in the Korean Intellectual Property Office (KIPO), the contents of which are herein incorporated by reference in their entirety.

BACKGROUND

1. Technical Field

Example embodiments of the present invention relate to a method of displaying a stereoscopic image and a display apparatus for performing the method. More particularly, example embodiments of the present invention relate to a method for displaying a stereoscopic image using a wavelength division system and a display apparatus for performing the method.

2. Discussion of the Related Art

Demand for three-dimensional (3D) stereoscopic images for use in areas, such as, for example, game applications or movies has called for various stereoscopic image display apparatuses.

A stereoscopic image display apparatus displays a 3D stereoscopic image using a principle of binocular parallax through a viewer's two eyes. For example, since the two eyes are spaced apart from each other, images with different angles are perceived by the human's brain. The perceived images are mixed in the viewer's brain. Through this series of processes, the viewer's brain may recognize the two images as a stereoscopic image.

As one of the methods of implementing stereoscopic images using the binocular parallax, there is a liquid crystal shutter glasses-type method.

In an LCD apparatus driven by a progressive scan method, line data are applied to a plurality of horizontal lines of the LCD apparatus at different times with different liquid crystal response speeds. When left-eye and right-eye images are alternately displayed to form a stereoscopic image, crosstalk may occur between the left-eye and right-eye images due to a difference in grayscale between the left-eye and right-eye images and the above characteristics of the progressive scan method. The crosstalk may deteriorate display quality of the stereoscopic image.

SUMMARY OF THE INVENTION

Example embodiments of the present invention provide a method of displaying a stereoscopic image capable of preventing crosstalk between the left-eye and right-eye images and a display apparatus for performing the method.

According to an embodiment, a method of displaying a stereoscopic image provides a first light having a first wavelength or a second light having a second wavelength different from the first wavelength to the a display panel according to a left-eye image or a right-eye image displayed on the display panel. By correcting at least one of left-eye color data corresponding to the left-eye image and right-eye color data corresponding to the right-eye image, color correcting data is generated such that a first color coordinate of the first light and a second coordinate of the second light coincide with each other with respect to the same color. The color correcting data is provided to the display panel.

According to an embodiment, a display apparatus includes a display panel, a light source part, a color data correcting unit, and a panel driving part. The display panel displays an image. The light source part includes a first light source generating a first light having a first wavelength and a second light source generating a second light having a second wavelength. The first light and the second light are provided to the display panel according to the left-eye image and the right-eye image displayed on the display panel. The color data correcting unit corrects at least one of left-eye color data corresponding to the left-eye image and right-eye color data corresponding to the right-eye image to generate color correcting data such that a first color coordinate of the first light and a second coordinate of the second light coincide with each other with respect to the same color. The panel driving part provides the display panel with the color correcting data.

According to an embodiment, a method of displaying a stereoscopic image provides a display panel with first and second lights respectively depending on left-eye and right-eye images displayed on the display panel, wherein the first and second lights have different wavelengths, and corrects left-eye color data or right-eye color data to have the same color coordinate, wherein the left-eye and right-eye color data correspond to the left-eye and right-eye images, respectively. The corrected color data is provided to the display panel. The opening and closing of glasses are adjusted in synchronization with the provision of the corrected color data.

According to the embodiments, light having wavelength bands different from each other are used to display left-eye and right-eye images, thus increasing display quality of the stereoscopic image. By correcting at least one of left-eye image data and right-eye image data, it may be possible to eliminate a color difference between the left-eye image and the right-eye image due to the wavelength division method.

BRIEF DESCRIPTION OF THE DRAWINGS

The embodiments of the present invention will become more apparent by describing in detail example embodiments thereof with reference to the accompanying drawings, in which.

DETAILED DESCRIPTION OF THE INVENTION

Hereinafter, example embodiments of the present invention will be described in detail with reference to the accompanying drawings.

Figure 1:
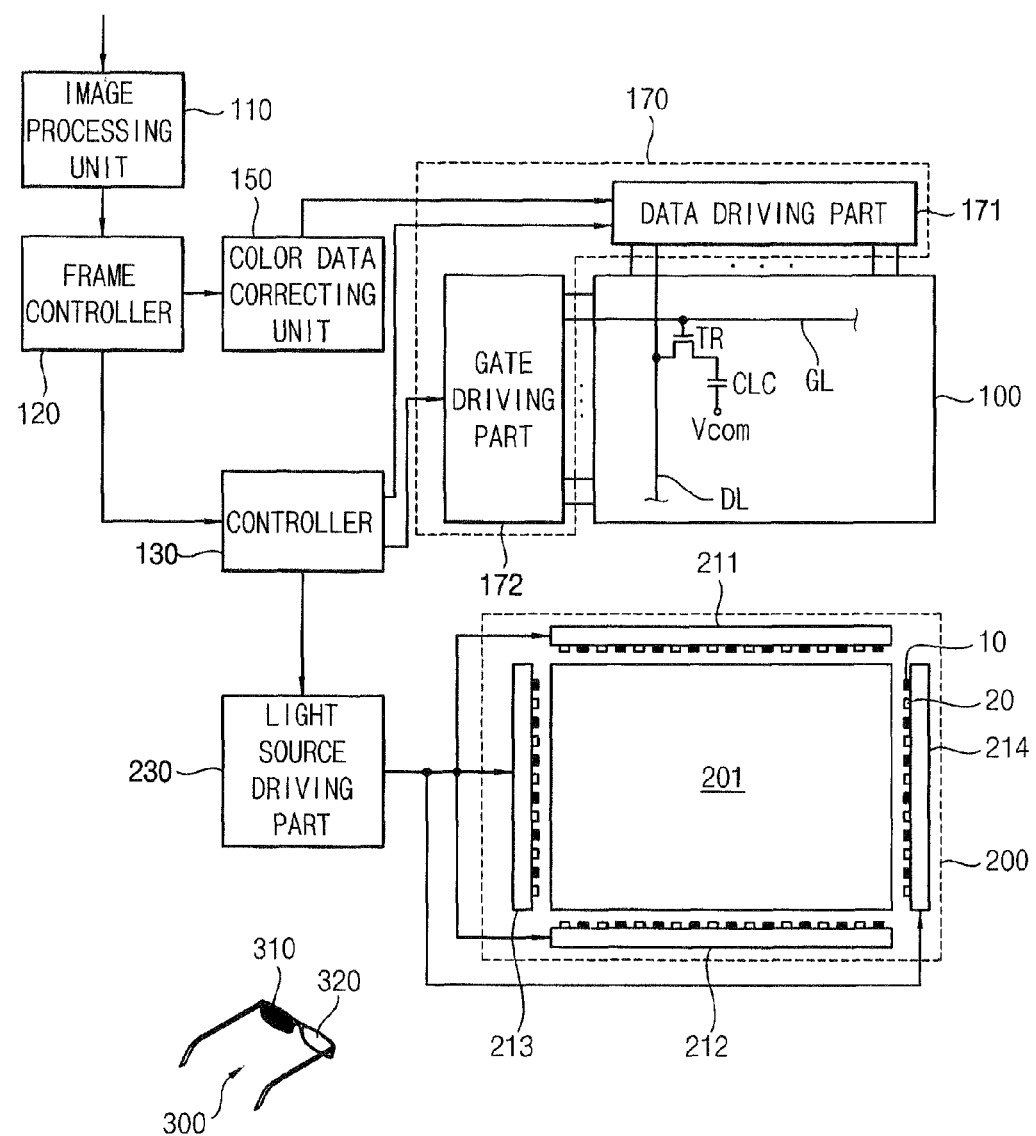
FIG. 1 is a block diagram illustrating a display apparatus according to an example embodiment.

FIG. 1 is a block diagram illustrating a display apparatus according to an example embodiment of the present invention.

Referring to FIG. 1, the display apparatus includes a display panel 100, an image processing unit 110, a frame controller 120, a controller 130, a color data correcting unit 150, a panel driving part 170, a light source driving part 230, and a glasses part 300.

The display panel 100 includes a plurality of pixels that display an image. For example, each of pixels may include a thin transistor TR connected to a data line DL and a gate line GL, a liquid crystal capacitor CLC having a first end connected to the thin transistor TR and a second end to which a common voltage Vcom is applied.

The image processing unit 110 receives compressed data, and generates left-eye data and right-eye data using the compressed data. For example, by using compressed data of 60 Hz, left-eye data and right-eye data of 120 Hz are generated. According to an example embodiment, data of 60 Hz are image data to display an image frame with a frequency of 60 Hz, data of 120 Hz are image data to display an image frame with a frequency of 120 Hz, and data of 240 Hz are image data to display an image frame with a frequency of 240 Hz. Data of 480 Hz are image data to display an image frame with a frequency of 480 Hz.

The frame controller 120 receives the left-eye data and the right-eye data. The frame controller 120 generates k left-eye data frames using the left-eye data, and k right-eye data frames using the right-eye data. According to an example embodiment, k is a natural number not less than 2. A data frame corresponds to an image frame displayed on the display panel 100.

For example, the frame controller 120 generates a first left-eye data frame, a second left-eye data frame, a first right-eye data frame, and a second right-eye data frame by repeatedly using each of the left-eye data and the right-eye data two times. Alternatively, the frame controller 120 generates a first left-eye data frame, a second left-eye data frame, a third left-eye data frame, a fourth left-eye data frame, a first right-eye data frame, a second right-eye data frame, a third right-eye data frame, and a fourth right-eye data frame by repeatedly using each of the left-eye data and the right-eye data four times.

The controller 130 controls an operation of the color data correcting unit 150 based on a synchronization signal provided from the frame controller 120. The controller 130 controls driving timing of the display apparatus.

The color data correcting unit 150 corrects color data of the data frame for the color balancing of the data frame provided from the frame controller 120. For example, in a 2D image mode, the color data correcting unit 150 uniformly corrects color coordinates of an achromatic color and a chromatic color by correcting red, green and blue data included in the data frame, and in a 3D image mode, the color data correcting unit 150 corrects a color difference between the left-eye data frame and the right-eye data frame, so that the color coordinates of the achromatic color and chromatic color are uniformly corrected. Hereinafter, the color data correcting unit 150 is described below in detail.

The panel driving part 170 includes a data driving part 171 and a gate driving part 173. The panel driving part 170 displays the data frame corrected by the color data correcting unit 150 on the display panel 100. The data driving part 171 converts color data of the corrected data frame into an analog-type data voltage under the control of the controller 130 and then provides the data voltage to the data line DL. The gate driving part 173 generates a gate signal under the control of the controller 130 and provides the gate signal to the gate line GL. The panel driving part 170 displays an image frame on the display panel 100 using a progressive scan method. In a 3D image mode, the panel driving part 170 inserts a black data frame between the left-eye data frame and the right-eye data frame provided from the frame controller 120, and outputs the black data frame, the left-eye data frame, and the right-eye data frame. For example, in the case of an image with a frequency of 240 Hz, the panel driving part 170 sequentially provides the display panel 100 with data voltages corresponding to a left-eye data frame, a black data frame, a right-eye data frame, and a black data frame. In the case of an image with a frequency of 480 Hz, the panel driving part 170 sequentially provides the display panel 100 with data voltages corresponding to a first left-eye data frame, a second left-eye data frame, a third left-eye data frame, a first black data frame, a first right-eye data frame, a second right-eye data frame, a third right-eye data frame, and a second black data frame.

The light source part 200 includes a light guide plate 201 and a plurality of light emitting modules 211, 212, 213, and 214. For example, a first light emitting module 211 is disposed at a first side of the light guide plate 201, a second light emitting module 212 is disposed at a second side of the light guide plate 201 to be opposite to the first light emitting module 211, a third light emitting module 213 is disposed at a third side of the light guide plate 201 to be adjacent to the first light emitting module 211, and a fourth light emitting module 214 is disposed at a fourth side of the light guide plate 201 to be opposite to the third light emitting module 213.

Each of the light emitting modules includes a plurality of first light sources 10 and a plurality of second light sources 20. The first light sources 10 generate a first light having a first wavelength band, and the second light sources 20 generate a second light having a second wavelength band. For example, each of the first light sources 10 includes a light emitting diode LED and a band pass filter that filters a light generated from the light emitting diode LED to extract the first light, and each of the second light sources 20 includes a light emitting diode LED and a band pass filter that filters a light generated from the light emitting diode LED to extract the second light. Hereinafter, the first light sources are also referred as left-eye light sources, the first light is also referred as a left-eye light, the second light sources are also referred as right-eye light sources, and the second light is also referred as a right-eye light.

The light source driving part 230 controls an operation of the light source part 200 under the control of the controller 130. The light source driving part 230 generates a left-eye light source signal for driving the first light source 10, and a right-eye light source signal for driving the second light source 20. For example, in a 2D mode, the left-eye light source signal and the right-eye light source signal, which are synchronized with each other, are generated to simultaneously drive the first light source 10 and the second light source 20. In a 3D mode, the left-eye light source signal and the right-eye light source signal, which are respectively synchronized with a left-eye image and a right-eye image displayed on the display panel 100, are generated.

The glasses part 300 includes a left-eye shutter 310 and a right-eye shutter 320. The left-eye shutter 310 includes a first band pass filter to filter the left-eye light having the first wavelength band, and the right-eye shutter 320 includes a second band pass filter to filter the right-eye light having the second wavelength band. The glasses part 300 opens the left-eye shutter 310 and closes the right-eye shutter 320 when the left-eye image is displayed on the display panel 100, and opens the right-eye shutter 320 and closes the left-eye shutter 310 when the right-eye image is displayed on the display panel 100.

Figure 2:
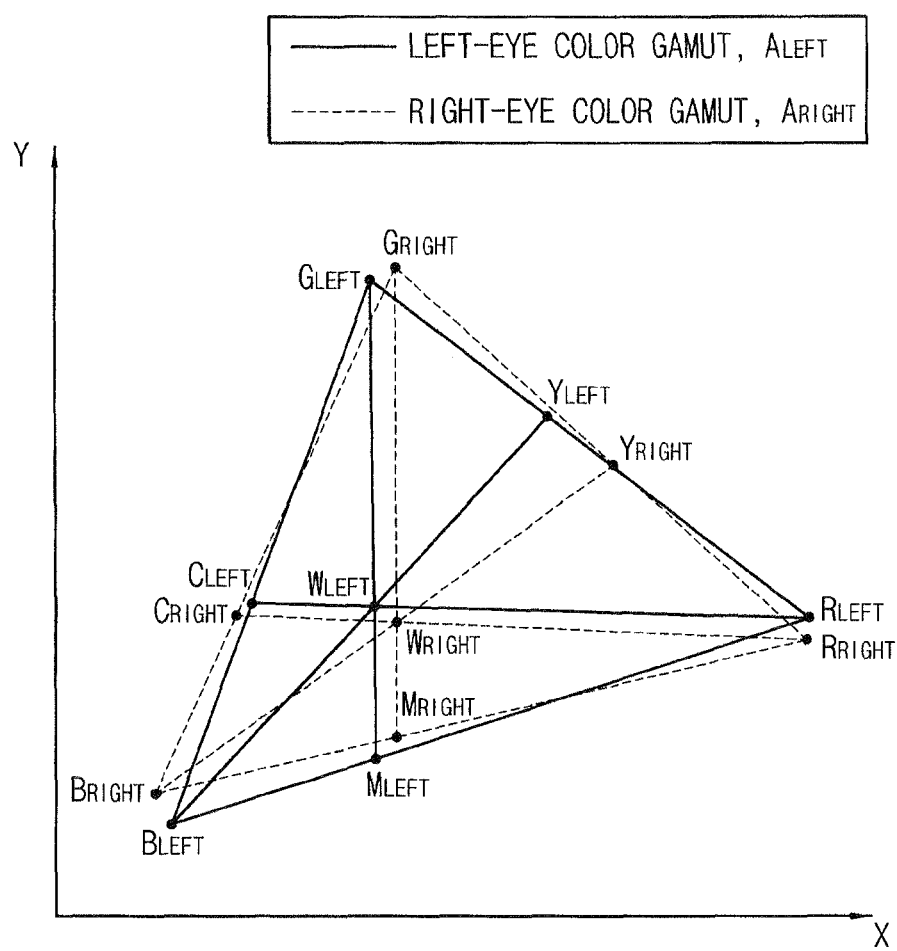
FIG. 2 is a chromaticity diagram illustrating color gamuts of a left-eye light and a right-eye light generated from the light source part in FIG. 1.

FIG. 2 is a chromaticity diagram illustrating color gamuts of a left-eye light and a right-eye light generated from the light source part in FIG. 1.

Referring to FIGS. 1 and 2, the left-eye light source 10 generates a left-eye light having a first wavelength band, and the right-eye light source 20 generates a right-eye light having a second wavelength band. The left-eye light and the right-eye light having wavelength bands different from each other have chromaticity diagrams inconsistent to each other.

As described in FIG. 2, the chromaticity diagram of the left-eye light LCG has a left-eye color gamut $A_{LEFT}$, and the chromaticity diagram of the right-eye light RCG has a right-eye color gamut $A_{RIGHT}$. The chromaticity diagram of the left-eye light LCG has a first red coordinate $R_{LEFT}$, a first green coordinate $G_{LEFT}$, a first blue coordinate $B_{LEFT}$, a first cyan coordinate $C_{LEFT}$, a first magenta coordinate $M_{LEFT}$, a first yellow coordinate $Y_{LEFT}$, and a first white coordinate $W_{LEFT}$. Alternatively, the chromaticity diagram of the right-eye light RCG has a second red coordinate $R_{RIGHT}$, a second green coordinate $G_{RIGHT}$, a second blue coordinate $B_{RIGHT}$, a second cyan coordinate $C_{RIGHT}$, a second magenta coordinate $M_{RIGHT}$, a second yellow coordinate $Y_{RIGHT}$, and a second white coordinate $W_{RIGHT}$ at different positions from positions where the coordinates of the same colors are located in the chromaticity diagram of the left-eye light LCG.

Because the color coordinates of the left-eye light generated from the left-eye light sources 10 are inconsistent to the color coordinates of the right-eye light generated from the right-eye light sources 20, a color difference may occur between a left-eye image and a right-eye image. According to an example embodiment, the color data correcting unit 150 may correct color data for a 3D image and color data for a 2D image, so that a display quality of a color image may be enhanced.

Hereinafter, the color data correcting unit 150 according to the present example embodiment of the invention will be explained in detail with reference to the accompanying drawings.

Figure 3:
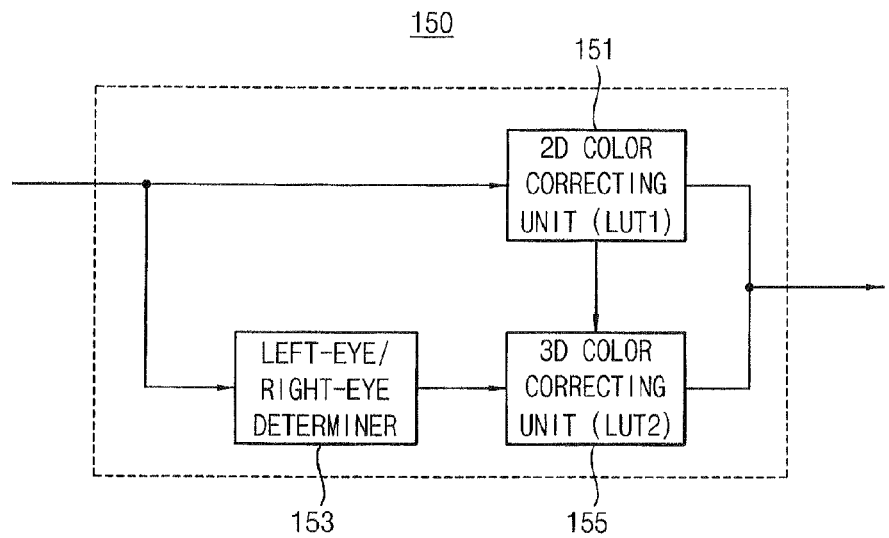
FIG. 3 is a block diagram illustrating the color data correcting unit of FIG. 1.
Figure 4:
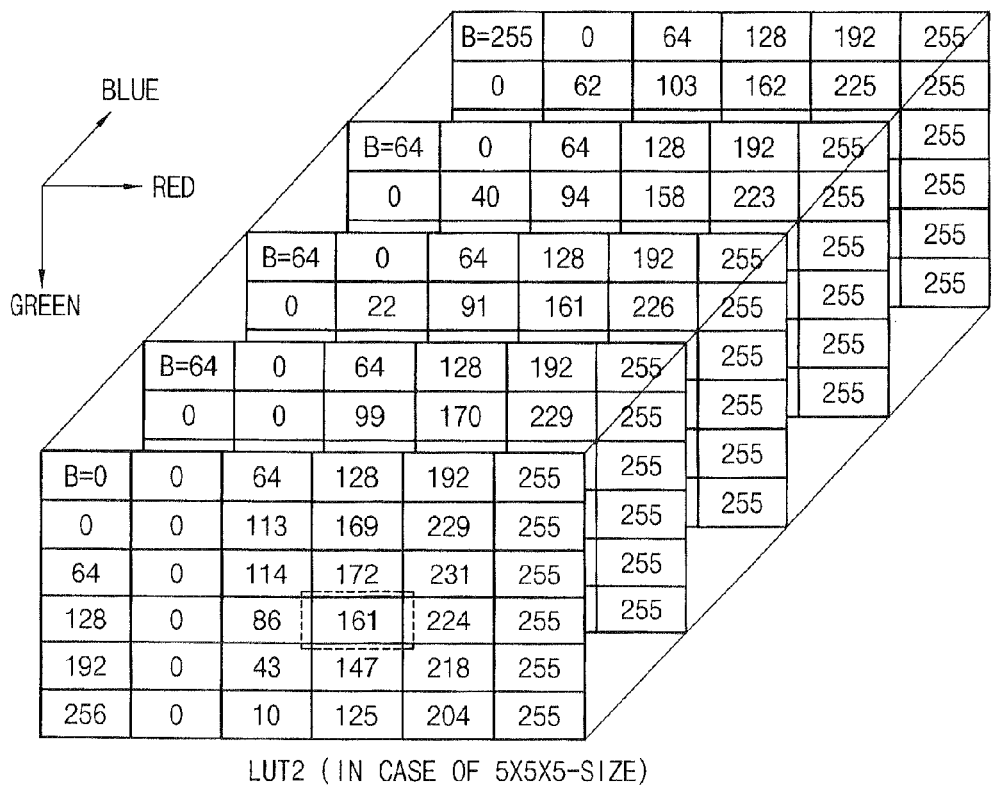
FIG. 4 is a conceptual view illustrating a look-up table applied to the 3D color correcting unit of FIG. 3.

FIG. 3 is a block diagram illustrating the color data correcting unit of FIG. 1. FIG. 4 is a conceptual view illustrating a look-up table applied to the 3D color correcting unit of FIG. 3.

Referring to FIGS. 1, 3, and 4, the color data correcting unit 150 includes a two-dimensional (2D) color correcting unit 151, a left-eye/right-eye determiner 153, and a three-dimensional (3D) color correcting unit 155.

The 2D color correcting unit 151 includes a first look-up table LUT1 storing color correcting data mapped to grayscale values. The first look-up table LUT1 stores the color correcting data to adjust a white balance, and color coordinates may be corrected uniformly using the color correcting data stored in the first look-up table LUT1. For example, in a 2D mode, when 2D color data is inputted, the color correcting data mapped to a grayscale value of the inputted color data is outputted. The first look-up table LUT1 has color correcting data mapped to sampled grayscale values of predetermined grayscale values to minimize a size of memory, and color correcting data for the other grayscale values not stored in the first look-up table LUT1 are produced using an arithmetic logic.

The left-eye/right-eye determiner 153 determines if inputted data is left-eye data or right-eye data. For example, in a 3D mode, the left-eye/right-eye determiner 153 determines if inputted data is left-eye data or right-eye data by using a toggle signal and/or a 3D enable signal, which are informative signals inputted together with the data.

The 3D color correcting unit 155 corrects at least one of the left-eye color data and right-eye color data according to determination of the left-eye/right-eye determiner 153. For example, the 3D color correcting unit 155 corrects at least one of the left-eye color data and right-eye color data, such that a color displayed by a left-eye light and a color displayed by a right-eye light have the same color coordinate with respect to the same color. Accordingly, a color difference between a left-eye image and a right-eye image may be removed.

Referring to FIG. 4, the 3D color correcting unit 155 includes, for example, red, green, and blue second look-up tables LUT2 corresponding to inputted color data, for example, red, green, and blue data, respectively. Since the inputted data includes 3D data such as red, green, and blue data, a 3D look-up table may be applied to each of the red, green and blue second look-up tables LUT2. For example, red compensating data mapped to the red, green, and blue data is outputted using the red second look-up table LUT2, green compensating data mapped to the red, green, and blue data is outputted using the green second look-up table LUT2, and blue compensating data mapped to the red, green, and blue data is outputted using the blue second look-up table LUT2.

For example, a second look-up table LUT2 illustrated in FIG. 4 is assumed to be red second look-up table. In the second look-up table LUT2, grayscale values of red data are arranged in an X axis direction, grayscale values of blue data are arranged in a Y axis direction, and grayscale values of green data are arranged in a Z axis direction. For example, when inputted red, green, and blue data (R, G, B) are (128, 128, 0), "161" is outputted as red compensating data R' using the second look-up table LUT2 as shown in FIG. 4. Although not shown in the drawings, green compensating data G', for example, "128", and blue compensating data B', for example, "0", mapped to the inputted data (128, 128, 0)—may be likewise obtained by using the green second look-up table LUT2 and the blue second look-up table LUT2, respectively. Therefore, the 3D color correcting unit 155 may output the red, green, and blue compensating data (R', G', B') of (161, 128, 0) with respect to the inputted red, green, and blue data (R, G, B) of (128, 128, 0) using the red, green and blue second look-up tables LUT2.

The second look-up tables LUT2 are embodied to have a (5×5×5) size as shown in FIG. 4. However, the embodiments of the present invention are not limited thereto, and various sizes of second look-up tables LUT2, such as, for example, a (9×9×9) size, may be available according to the memory capacity.

The red, green, and blue compensating data respectively corresponding to red, green, and blue data not stored in the second look-up table LUT2 due to the limitation of memory capacity are generated by an interpolation method.

Figure 5A:
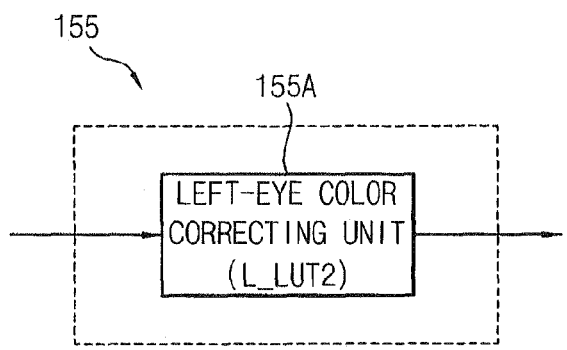
FIG. 5A to FIG. 5C are block diagrams illustrating the 3D color correcting unit according to various example embodiments of the present invention.

FIG. 5A is a block diagram illustrating the 3D color correcting unit described in FIG. 3.

Referring to FIGS. 3 and 5A, the 3D color correcting unit 155 includes a left-eye color correcting unit 155A. The left-eye color correcting unit 155A includes left-eye second look-up tables L_LUT2. The left-eye second look-up tables L_LUT2 include red, green, and blue second look-up tables L_LUT2 as described in FIG. 4. Left-eye red, green, and blue correcting data stored in the red, green, and blue second look-up tables L_LUT2 are obtained by correcting the left-eye red, green, and blue data, respectively, such that a color coordinate of a color displayed by the left-eye light is shifted to a color coordinate of a color displayed by the right-eye light as shown in FIG. 2.

As such, the 3D color correcting unit 155 generates the left-eye red, green, and blue correcting data using the inputted left-eye red, green, and blue data through the left-eye second look-up tables L_LUT2, and outputs the correcting data.

The right-eye red, green, and blue data received in the 3D color correcting unit 155 are bypassed. Alternatively, the right-eye red, green, and blue data may be corrected to right-eye red, green, and blue correcting data to adjust a white balance through the first look-up table LUT1 of the 2D color correcting unit 151.

The 3D color correcting unit 155 corrects the left-eye color data, so that a color displayed by a left-eye light, and a color displayed by a right-eye light with respect to the same color coincide with each other.

Figure 5B:
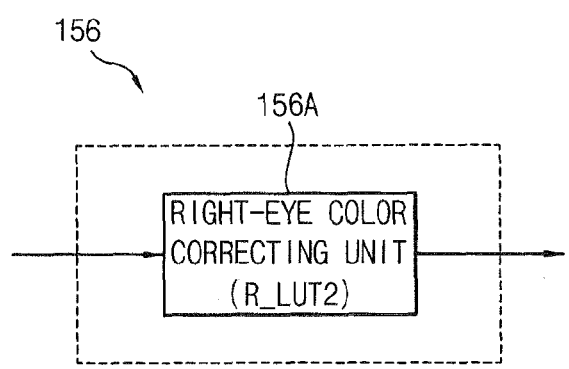

FIG. 5B is a block diagram illustrating a 3D color correcting unit according to an example embodiment of the present invention.

Referring to FIGS. 3 and 5B, the 3D color correcting unit 156 includes a right-eye color correcting unit 156A. The right-eye color correcting unit 156A includes right-eye second look-up tables R_LUT2. The right-eye second look-up tables R_LUT2 include red, green, and blue second look-up tables R_LUT2 as described in FIG. 4. Right-eye red, green, and blue correcting data stored in the red, green, and blue second look-up tables R_LUT2 are obtained by correcting the right-eye red, green, and blue data, respectively, such that a color coordinate of a color displayed by the right-eye light is shifted to a color coordinate of a color displayed by the left-eye light as shown in FIG. 2.

As such, the 3D color correcting unit 156 generates the right red, green, and blue correcting data using the inputted right-eye red, green, and blue data through the right-eye second look-up tables R_LUT2, and outputs the correcting data.

The left-eye red, green, and blue data received in the 3D color correcting unit 156 are bypassed. Alternatively, the left-eye red, green, and blue data may be corrected to left-eye red, green, and blue correcting data to adjust a white balance through the first look-up table LUT1 of the 2D color correcting unit 151.

The 3D color correcting unit 156 corrects the right-eye color data, so that a color displayed by a left-eye light, and a color displayed by a right-eye light with respect to the same color coincide with each other.

Figure 5C:
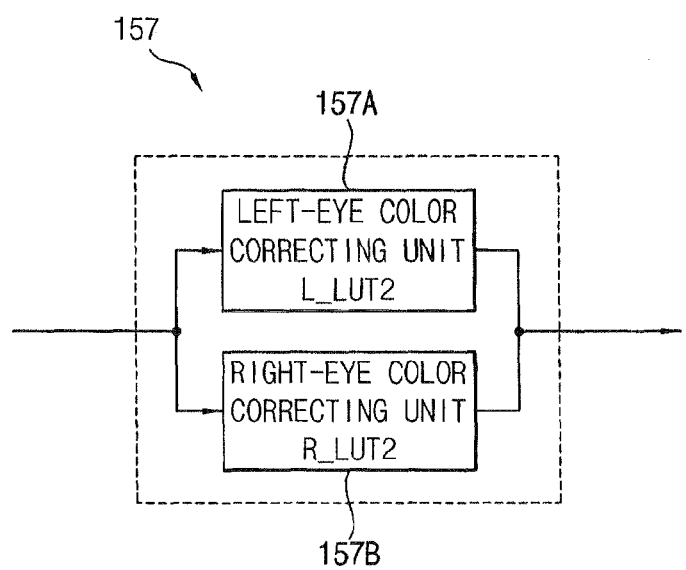

FIG. 5C is a block diagram illustrating a 3D color correcting unit according to an example embodiment of the present invention.

Referring to FIGS. 3 and 5C, the 3D color correcting unit 157 includes a left-eye color correcting unit 157A and a right-eye color correcting unit 157B.

The left-eye color correcting unit 157A includes left-eye second look-up tables L_LUT2. The left-eye second look-up tables L_LUT2 include red, green, and blue second look-up tables L_LUT2 as described in FIG. 4. Left-eye red, green, and blue correcting data are mapped to left-eye red, green, and blue data in the left-eye second look-up tables L_LUT2. The left-eye red, green, and blue correcting data are obtained by correcting the left-eye red, green, and blue data, respectively, such that a first color coordinate of a color displayed by the left-eye light is shifted to an intermediate position between the first color coordinate and a second color coordinate of a color displayed by the right-eye light as shown in FIG. 2, and thus, the first color coordinate of the left-eye light coincides with an arbitrary third color coordinate.

The right-eye color correcting unit 157B includes right-eye second look-up tables R_LUT2. The right-eye second look-up tables R_LUT2 include red, green, and blue second look-up tables R_LUT2 as described in FIG. 4. Left-eye red, green, and blue correcting data are mapped to right-eye red, green, and blue data in the right-eye second look-up tables R_LUT2. The right-eye red, green, and blue correcting data are obtained by correcting the right-eye red, green, and blue data, respectively, such that the second color coordinate of the color displayed by the right-eye light is shifted to the intermediate position between the first color coordinate of the color displayed by the left-eye light and the second color coordinate as shown in FIG. 2, and thus, the second color coordinate of the right-eye light coincides with the arbitrary third color coordinate.

The 3D color correcting unit 157 corrects the left-eye and right-eye color data so that a color displayed by the left-eye light and a color displayed by the right-eye light have the same color coordinate with respect to the same color. Accordingly, a color difference between a left-eye image and a right-eye image may be removed.

According to an embodiment, when at least one of grayscale values of inputted red, green, and blue data does not exist in the red, green, and blue second look-up tables LUT2, the 3D color correcting unit 157 may generate the red, green, and blue correcting data by an interpolation method using the color correcting data stored in the red, green, and blue second look-up tables LUT2. For example, when any one of inputted red, green, and blue data does not exist in the second look-up tables LUT2, color correcting data may be generated by a one-dimensional (1D) bi-linear interpolation method. When any two of the red, green, and blue data do not exist in the second look-up tables LUT2, color correcting data may be generated by a two-dimensional (2D) bi-linear interpolation method. When none of the red, green, and blue data exist in the second look-up tables LUT2, color correcting data may be generated by a three-dimensional (3D) diagonal interpolation method.

Figure 6:
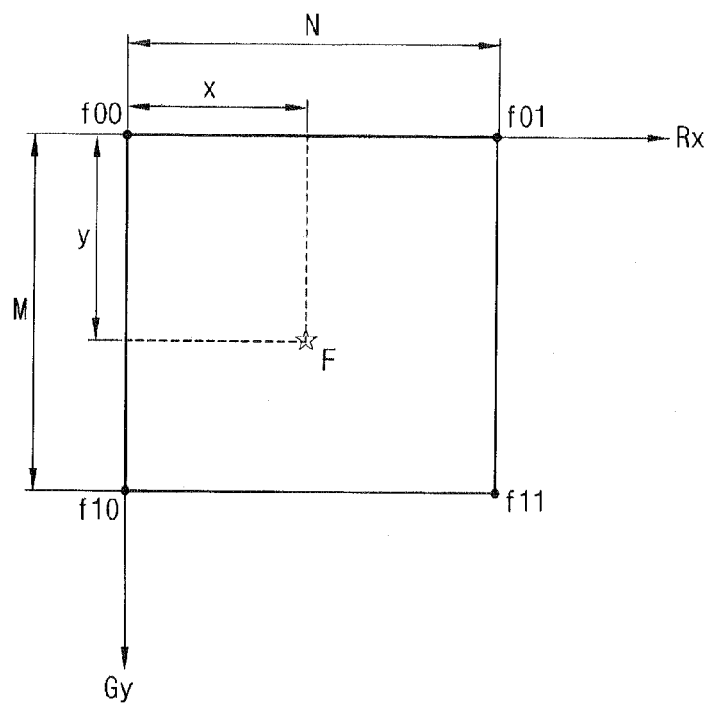
FIG. 6 is a conceptual view for illustrating a two-dimension (2D) bi-linear interpolation method by the 3D color correcting unit in FIG. 3.

FIG. 6 is a conceptual view for illustrating a two-dimensional (2D) bi-linear interpolation method by the 3D color correcting unit in FIG. 3. FIG. 6 illustrates a process of generating color correcting data by a 2D bi-linear interpolation method when only one of corresponding grayscale values of inputted red, green, and blue data exists in the second look-up table LUT2.

Referring to FIGS. 4 and 6, when a grayscale value of blue data exists in the second look-up table LUT2 but grayscale values of red and green data do not exist in the second look-up table LUT2, first, second, third, and fourth parameters f00, f01, f10, and f11 are used for the 2D bi-linear interpolation method. The first, second, third, and fourth parameters f00, f01, f10, and f11 represent compensating data sampled with respect to a red axis (Rx) and a green axis (Gy) in the second look-up table LUT2.

Compensating data F apart from f00 by x along the red axis (Rx) and by y along the green axis (Gy) is calculated by the following Equation 1 using the first, second, third, and fourth parameters f00, f01, f10, and f11:

$$F = f_{00} + (f_{01} - f_{00}) \times \frac{x}{N} + \qquad \text{[Equation 1]}$$
$$(f_{10} - f_{00}) \times \frac{y}{M} + (f_{00} + f_{11} - f_{01} - f_{10}) \times \frac{x}{N} \times \frac{y}{M}$$

Figure 7A:
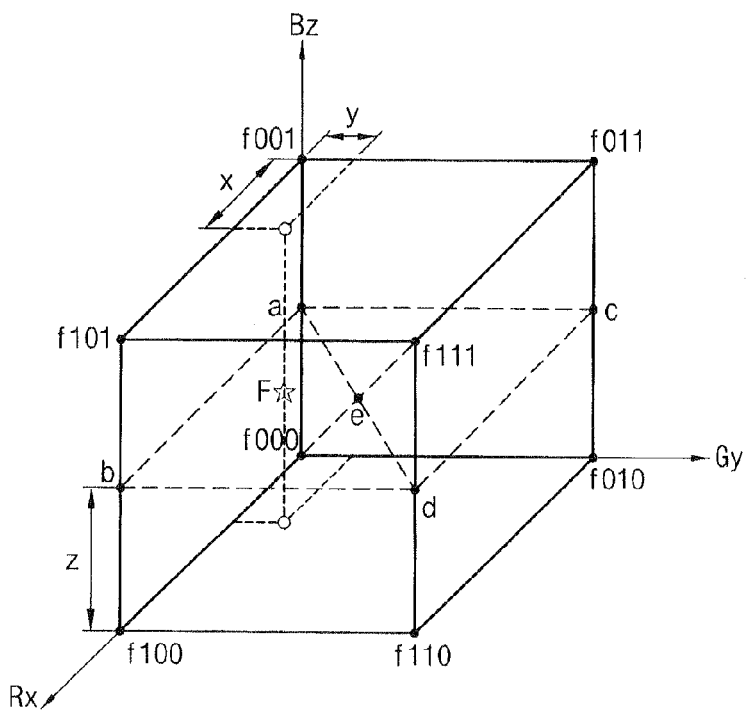
FIGS. 7A and 7B are conceptual views for illustrating a 3D diagonal interpolation method by the 3D color correcting unit in FIG. 3.
Figure 7B:
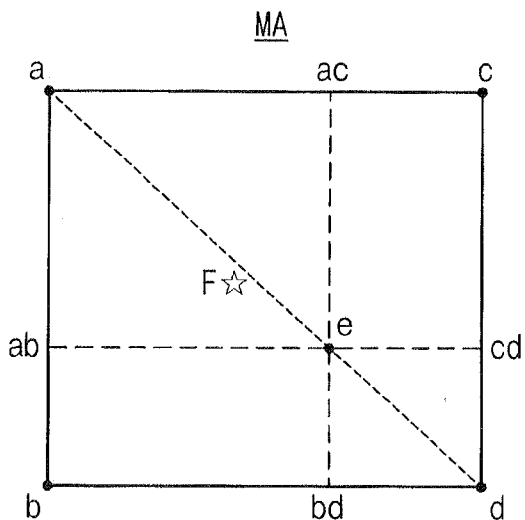

FIGS. 7A and 7B are conceptual views illustrating a 3D diagonal interpolation method by the 3D color correcting unit in FIG. 3. FIGS. 7A and 7B illustrate a process of generating color correcting data by a 3D diagonal interpolation method when none of grayscale values of inputted red, green, and blue data exist in the second look-up table LUT2.

Referring to FIGS. 4, 7A, and 7B, first, second, third, fourth, fifth, sixth, seventh, and eighth parameters f000, f001, f010, f011, f100, f101, f110, and f111 are used for the 3D interpolation method. The first, second, third, fourth, fifth, sixth, seventh, and eighth parameters f000, f001, f010, f011, f100, f101, f110, and f111 represent compensating data sampled with respect to a red axis (Rx), a green axis (Gy), and a blue axis (Bz) in the second look-up table LUT2.

Compensating data F apart from f000 by x along the red axis (Rx), by y along the green axis (Gy), and by z along the blue axis (Bz) is generated using the first to eighth parameters f000, f001, f010, f011, f100, f101, f110, and f111 as follows.

First of all, a main area MA, which is a two-dimensional (2D) area and includes blue data whose value is 'z', is considered as shown in FIG. 7B.

The main area MA includes first, second, third, and fourth sub parameters a, b, c, and d. The first, second, third, and fourth sub parameters a, b, c, and d are calculated in the following Equation 2.

$$a = f_{000} + (f_{001} - f_{000})\frac{z}{N} \qquad \text{[Equation 2]}$$
$$b = f_{010} + (f_{011} - f_{010})\frac{z}{N}$$
$$c = f_{100} + (f_{101} - f_{100})\frac{z}{N}$$
$$d = f_{110} + (f_{111} - f_{110})\frac{z}{N}$$

In Equation 2, 'N' is a distance between two neighboring sampled grayscale values in the second look-up table LUT2. For example, 'N' may be 64 in the case of a look-up table having a (5×5×5) size with respect to total 256 grayscale values.

Fifth and sixth sub parameters ab and ac are apart from the first sub parameter a by z along the red axis (Rx) and along the green axis (Gy), respectively, a seventh sub parameter bd is apart from the second sub parameter b by z along the green axis (Gy), and an eighth sub parameter cd is apart from the third sub parameter c by z along the red axis (Rx). The fifth, sixth, seventh, and eighth sub parameters are calculated in the following Equation 3:

$$ab = a + (b - a)\frac{z}{N} \qquad \text{[Equation 3]}$$
$$ac = a + (c - a)\frac{z}{N}$$
$$bd = b + (d - b)\frac{z}{N}$$
$$cd = c + (d - c)\frac{z}{N}$$

Alternatively, a ninth parameter e is a diagonal component between the first parameter f000 and the eighth parameter f111. For example, the ninth parameter e is located at an intersection of a virtual line linking between the first parameter f000 and the eighth parameter f111 and the main area MA. The ninth parameter e represents when the red, green, and blue data are 'z' (i.e., R=G=B=z)—that is, the ninth parameter e is compensating data (z') for an achromatic color. According to an embodiment, the ninth parameter e may represent R=G=B=x or y.

$$e = z' \qquad \text{[Equation 4]}$$

Accordingly, the ninth parameter e is acquired through the first look-up table LUT1 for white balance of the 2D color correcting unit 151 shown in FIG. 3. By applying correcting data stored in the first look-up table LUT1 for white balance to the achromatic color, a deterioration of the white balance by the 3D diagonal interpolation method may be prevented.

Then, based on the ninth parameter e, the main area MA is divided into four sub areas that are first, second, third, and fourth sub areas SA1, SA2, SA3, and SA4. According to the position of the compensating data F with respect to the first, second, third, and fourth sub areas SA1, SA2, SA3, and SA4, the compensating data F is calculated as follows.

Figure 8A:
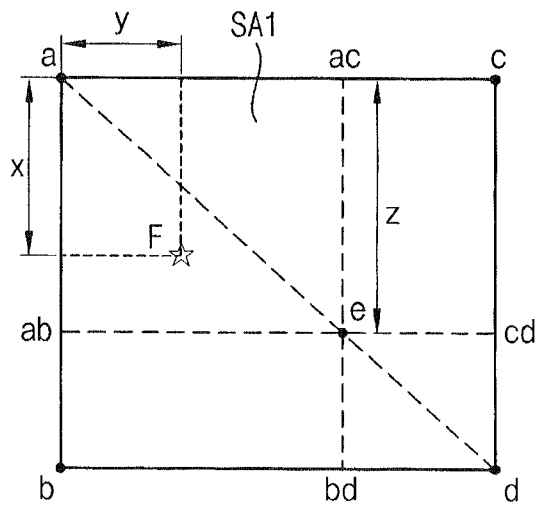
FIGS. 8A, 8B, 8C and 8D are conceptual views for describing a bi-linear interpolation method according to the sub areas shown in FIG. 7B.

FIGS. 8A, 8B, 8C, and 8D are conceptual views for describing a bi-linear interpolation method according to the sub areas shown in FIG. 7B As shown in FIG. 8A, when the compensating data F is located in the first sub area SA1 (x≤z and y≤z), the compensating data F is calculated in the following Equation 5:

$$F = a + (ab-a)\frac{x}{z} + (ac-a)\frac{y}{z} + (a+e-ab-ac)\frac{xy}{z^2}$$
$$= a + (b-a)\frac{x}{N} + (c-a)\frac{y}{N} + \left\{e-a-(b+c-2a)\frac{z}{N}\right\}\frac{xy}{z^2}$$ [Equation 5]

Figure 8B:
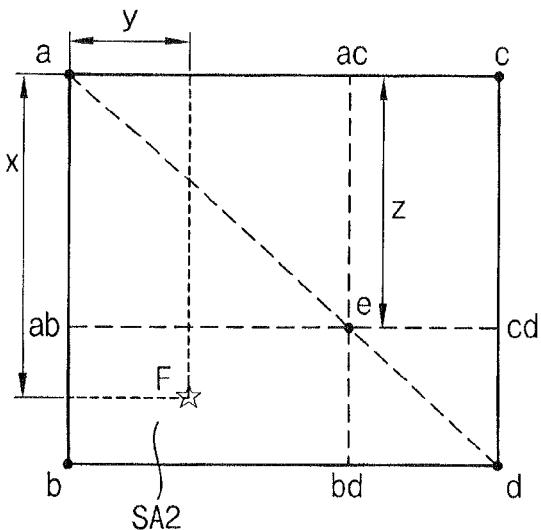

As shown in FIG. 8B, when the compensating data F is located in the second sub area SA2 (x≥z and y≤z), the compensating data F is calculated in the following Equation 6:

$$F = ab + (b-ab)\frac{x-z}{N-z} + (e-ab)\frac{y}{z} +$$
$$(ab+bd-b-e)\frac{(x-z)y}{(N-z)z}$$
$$= a + (c-a)\frac{z}{N} + \left((e-a) - \left(c - a\frac{z}{N}\right)\right)\frac{x}{z} +$$
$$(c-a)\left(1 - \frac{z}{N}\right)\frac{y-z}{N-z} + \left\{a - e + (d-a)\frac{z}{N}\right\}$$
$$\frac{(y-z)x}{(N-z)z}$$ [Equation 6]

Figure 8C:
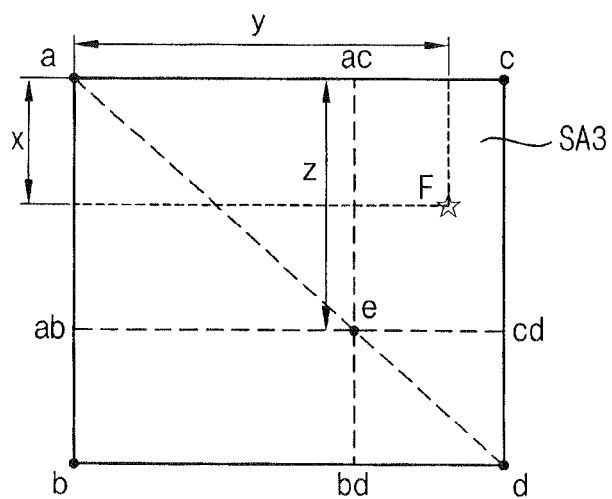

As shown in FIG. 8C, when the compensating data F is located in the third sub area SA3 (x≤z and y≥z), the compensating data F is calculated in the following Equation 7:

$$F = ac + (e-ac)\frac{x}{z} + (c-ac)\frac{y-z}{N-z} +$$
$$(ac+cd-c-e)\frac{(y-z)x}{(N-z)z}$$
$$= a + (c-a)\frac{z}{N} + \left\{(e-a) - \left(c - a\frac{z}{N}\right)\right\}\frac{x}{z} + (c-a)$$
$$\left(1 - \frac{z}{N}\right)\frac{y-z}{N-z} + \left\{a - e + (d-a)\frac{z}{N}\right\}\frac{(y-z)x}{(N-z)z}$$ [Equation 7]

Figure 8D:
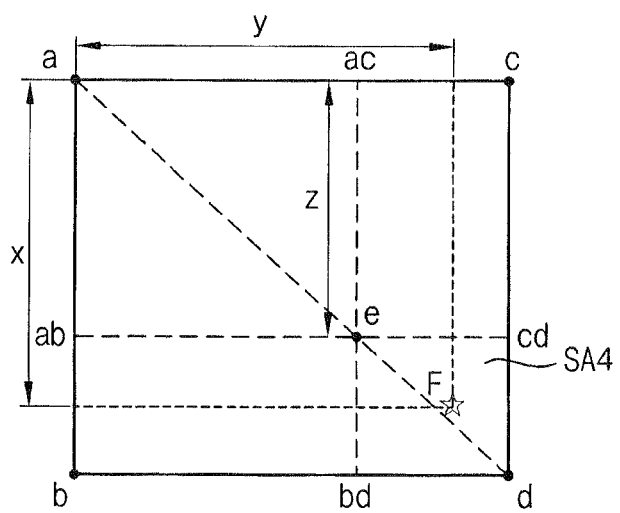

As shown in FIG. 8D, when the compensating data F is located in the third sub area SA3 (x≥z and y≥z), the compensating data F is calculated in the following Equation 8:

$$F = e + (bd-e)\frac{x-z}{N-z} + (cd-e)\frac{y-z}{N-z} +$$
$$(e+d-bd-cd)\frac{(x-z)(y-z)}{(N-z)^2}$$
$$= e + \left\{b + (d-b)\frac{z}{N} - e\right\}\frac{x-z}{N-z} +$$
$$\left\{c + (d-c)\frac{z}{N} - e\right\}\frac{y-z}{N-z} +$$ [Equation 8]

$$\left\{e + d - b - (d-b)\frac{z}{N} - c - (d-c)\frac{z}{N}\right\}$$
$$\frac{(x-z)(y-z)}{(N-z)^2}$$

Figure 9:
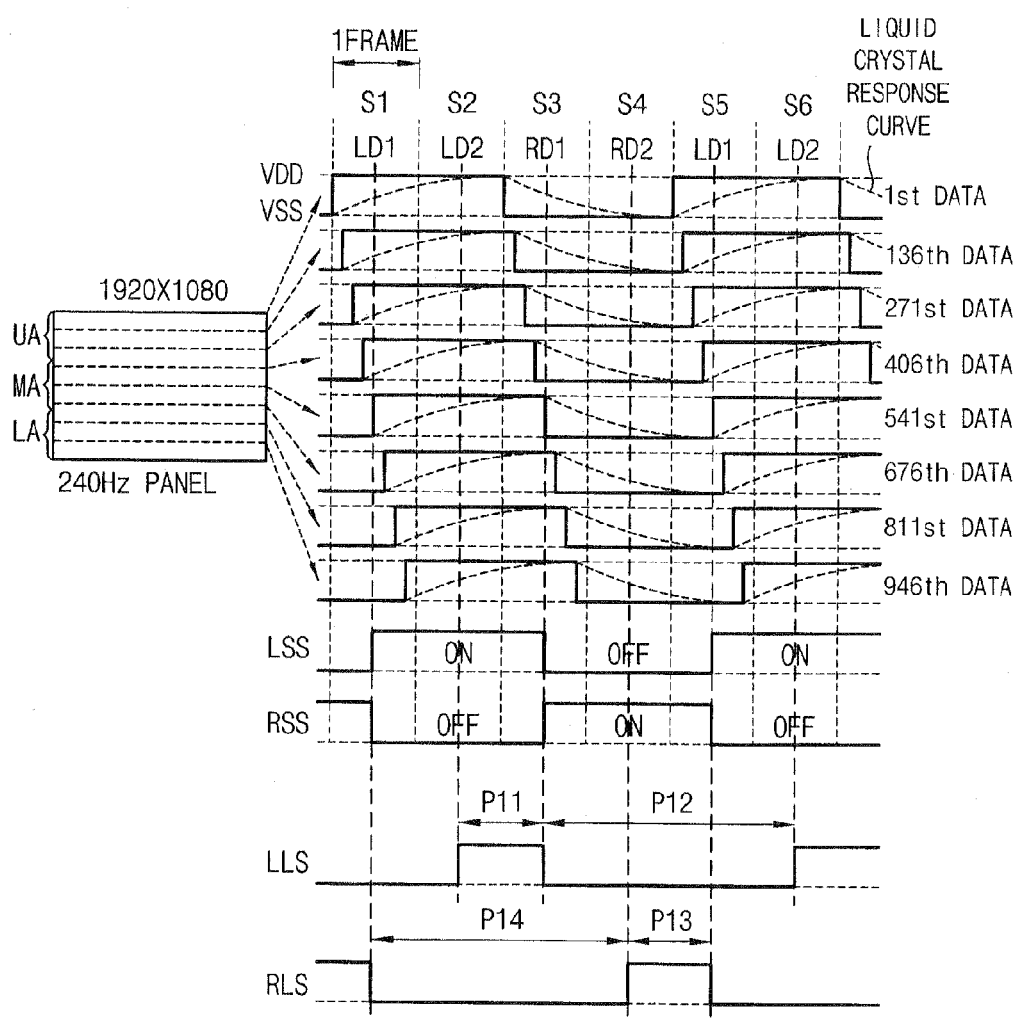
FIG. 9 is a conceptual view describing a method of driving the display apparatus in FIG. 1.

FIG. 9 is a conceptual view describing a method of driving the display apparatus in FIG. 1.

Referring to FIGS. 1 and 9, the display panel 100 has a resolution of 1920×1080. The panel driving part 170 provides the display panel 100 with data of first and second left-eye data frames LD1 and LD2 and data of first and second right-eye data frames RD1 and RD2 that each have a frequency of 240 Hz and are corrected by the color data correcting unit 150. According to an example embodiment, the first and second left-eye data frames LD1 and LD2 each correspond to a white frame image, and the first and second right-eye data frames RD1 and RD2 each correspond to a black frame image.

A sub interval in which the panel driving part 170 outputs a data frame to the display panel 100 is about 4 ms, and a main interval in which data frames LD1, LD2, RD1, and RD2 of a stereoscopic image are displayed on the display panel 100 may be about 16 ms. Therefore, the display panel 100 may be driven with a frame frequency of about 240 Hz.

The panel driving part 170 sequentially outputs data of data frames from a first horizontal line to a last horizontal line (e.g., 1080th line) of the display panel 100 during sub intervals. Data of the first and second left-eye data frames LD1 and LD2 have a high voltage VDD corresponding to a white image, and data of the first and second right-eye data frames RD1 and RD2 have a low voltage VSS corresponding to a black image.

The panel driving part 170 provides the display panel 100 with data of the first left-eye data frame LD1 during a first sub interval S1, data of the second left-eye data frame LD2 during a second sub interval S2, data of the first right-eye data frame RD1 during a third sub interval S3, and data of the second right-eye data frame RD2 during a fourth sub interval S4.

The display panel 100 displays an image corresponding to the data. The image display is delayed by a liquid crystal response time from when the data is applied to the display panel 100.

Assuming that there is negligible or no delay between the application of the data and the image display, when dividing the third sub interval S3 into early, middle, and latter parts, a left-eye image corresponding to the previous second left-eye data frame LD2 is converted to a right-eye image corresponding to the first right-eye data frame RD1 in an upper area UA of the display panel 100, and the left-eye image of the previous frame is displayed in middle and lower areas MA and LA during the early part of the third sub interval S3. The right-eye image is displayed in the upper area UA of the display panel 100, the left-eye image is converted to the right-eye image in the middle area MA, and the left-eye image of the previous frame is displayed in the lower area LA during the middle part of the third sub interval S3. The right-eye image is displayed in the upper and middle areas UA and MA of the display panel 100, and the left-eye image of the previous frame is converted to the right-eye image in the lower area LA during the latter part of the third sub interval S3.

The display panel 100 displays a left-eye image during a first interval P11, displays right-eye and mixed images during a second interval P12, displays the right-eye image during a third interval P13, and displays the left-eye and mixed images during a fourth interval P14. The first to fourth intervals P11, P12, P13, and P14 may be set differently according to the liquid crystal response time. As used herein, the term "mixed images" may be used to represent a situation where a left-eye image and a right-eye image are displayed together on the display panel 100.

In synchronization with an interval in which an image is displayed on the display panel 100, the light source driving part 230 generates a left-eye light source signal LLS for driving the left-eye light source 10 and a right-eye light source signal RLS for driving the right-eye light source 20. The left-eye light source signal LLS is at a high level during the first interval P11 in which the left-eye image is displayed on the display panel 100, and is at a low level during the second interval P12 in which the right-eye and mixed images are displayed on the display panel 100. The right-eye light source signal RLS is at a high level during the third interval P13 in which the right-eye image is displayed on the display panel 100, and is at a low level during the fourth interval P14 in which the left-eye and mixed images are displayed on the display panel 100.

The light source part 200 provides the display panel 100 with a left-eye light during the first interval P11 and blocks the left-eye light during the second interval P12. The light source part 200 provides the display panel 100 with a right-eye light during the third interval P13 and blocks the right-eye light during the fourth interval P14. Therefore, the light source part 200 provides the display panel 100 with the left-eye light or right-eye light when the left-eye or right-eye image is displayed on the display panel 100, and does not provide the display panel 100 with the left-eye light and right-eye light when the mixed image is displayed on the display panel 100.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level and the left-eye image is displayed on the display panel 100 during a period from a partial section of the first sub interval S1 to a partial section of the third sub interval S3, and the left-eye shutter signal LSS is at a low level and the right-eye image is displayed on the display panel 100 during a period from a partial section of the third sub interval S3 to a partial section of the fifth sub interval S5. The right-eye shutter signal RSS is at a low level during the period from a partial section of the first sub interval S1 to a partial section of the third sub interval S3, and is at a high level during the period from a partial section of the third sub interval S3 to a partial section of the fifth sub interval S5. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 200 provides a light to the display panel 100 only when the left-eye image or right-eye image is displayed on the display panel 100, no crosstalk is perceived between the left-eye image and the right-eye image.

FIG. 10A to FIG. 10E are block diagrams illustrating various example embodiments for the light source part described in connection with FIG. 1.

Figure 10A:
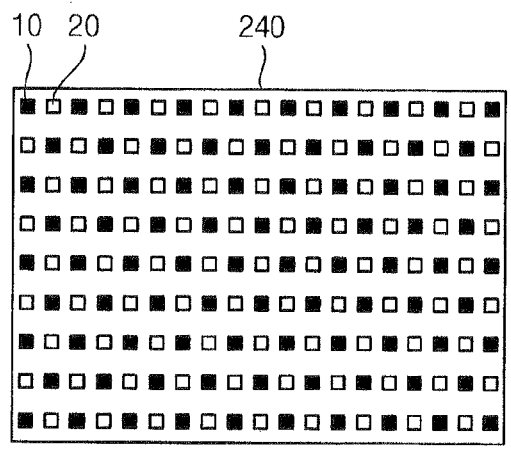
FIG. 10A to FIG. 10E are block diagrams illustrating various example embodiments for the light source part described in connection with FIG. 1.

Referring to FIG. 10A, a light source part 240 includes a plurality of left-eye light sources 10 and a plurality of right-eye light sources 20. Each of the light sources may be a light emitting diode (LED). Alternately, the light sources may be fluorescent lamps generating a left-eye light and a right-eye light. The light source part 240 has a direct-type structure that is placed under the display panel 100.

Figure 10B:
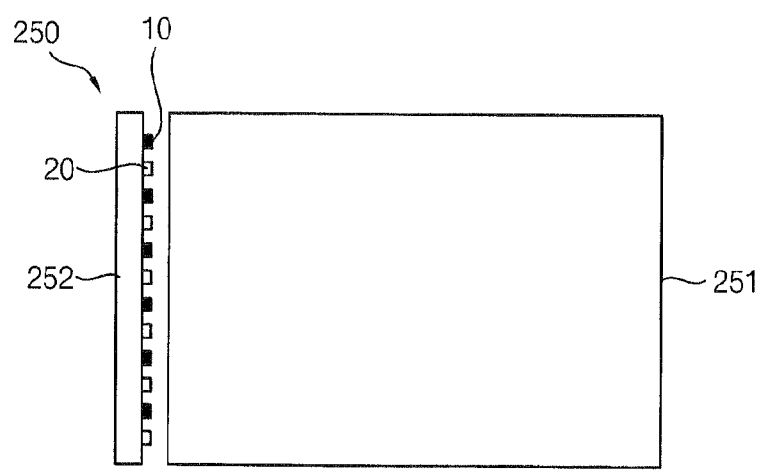

Referring to FIG. 10B, a light source part 250 includes a light guide plate 251 under the display panel 100 and a light emitting module 252 on a short side of the light guide plate 251. The light emitting module 252 includes a plurality of left-eye light sources 10 and a plurality of right-eye light sources 20. Each of the light sources includes a light emitting diode (LED). Alternately, fluorescent lamps generating a left-eye light and a right-eye light may be placed on the short side of the light guide plate 251 instead of the light emitting module 252.

Figure 10C:
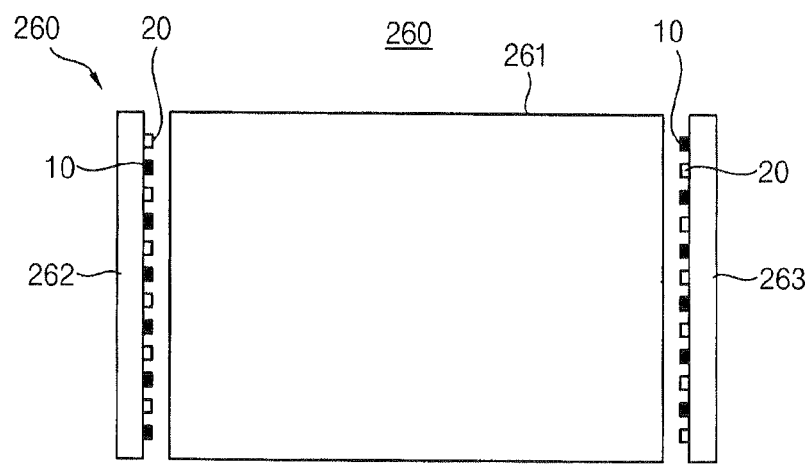

Referring to FIG. 10C, a light source part 260 includes a light guide plate 261 under the display panel 100, a first light emitting module 262 on a first short side of the light guide plate 261, and a second light emitting module 263 on a second short side of the light guide plate 261. Each of the first and second light emitting modules 262 and 263 includes a plurality of left-eye light sources 10 and a plurality of right-eye light sources 20. Each of the light sources includes a light emitting diode (LED). Alternately, fluorescent lamps generating a left-eye light and a right-eye light may be placed on the first and second short sides of the light guide plate 261, respectively, instead of the first and second light emitting modules 262 and 263.

Figure 10D:
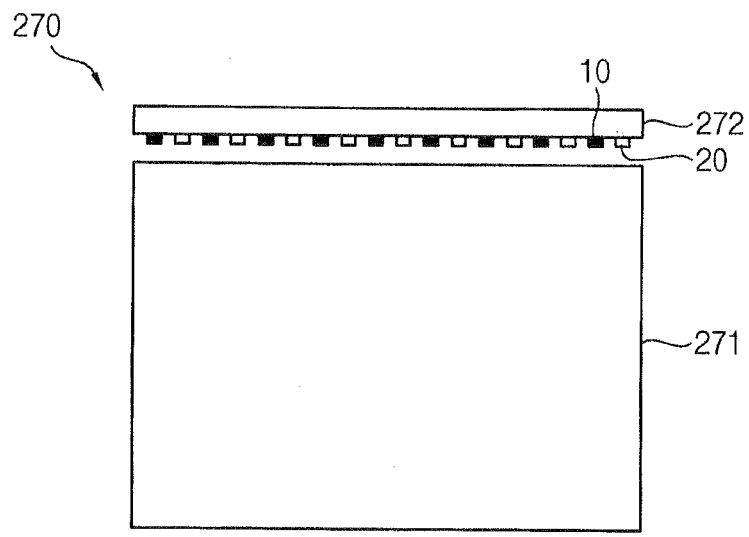

Referring to FIG. 10D, a light source part 270 includes a light guide plate 271 under the display panel 100 and a light emitting module 272 on a long side of the light guide plate 271. The light emitting module 272 includes a plurality of left-eye light sources 10 and a plurality of right-eye light sources 20. Each of the light sources includes a light emitting diode (LED). Alternately, fluorescent lamps generating a left-eye light and a right-eye light may be placed on the long side of the light guide plate 271 instead of the light emitting module 272.

Figure 10E:
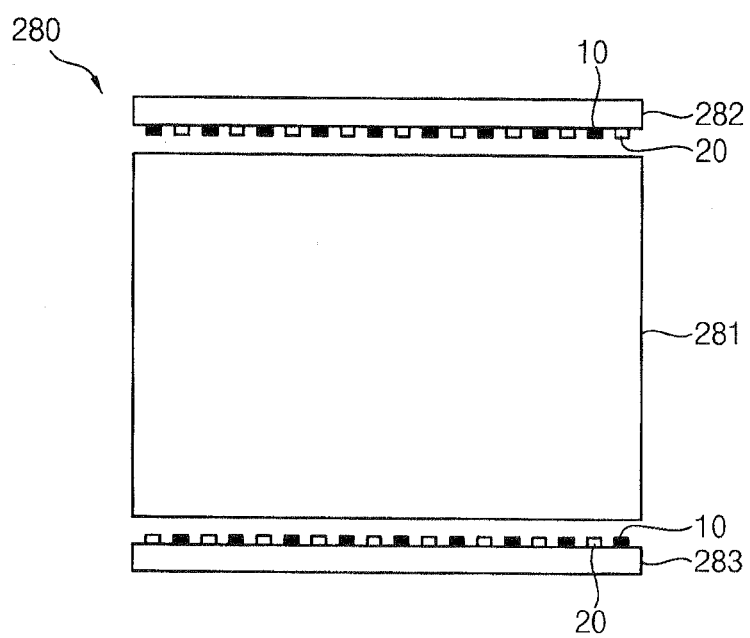

Referring to FIG. 10E, a light source part 280 includes a light guide plate 281 under the display panel 100, a first light emitting module 282 on a first long side of the light guide plate 281, and a second light emitting module 283 on a second long side of the light guide plate 281. Each of the first and second light emitting modules 282 and 283 includes a plurality of left-eye light sources 10 and a plurality of right-eye light sources 20. Each of the light sources includes a light emitting diode (LED). Alternately, fluorescent lamps generating a left-eye light and a right-eye light may be placed on the first and second long sides of the light guide plate 281, respectively, instead of the first and second light emitting modules 282 and 283.

Figure 11:
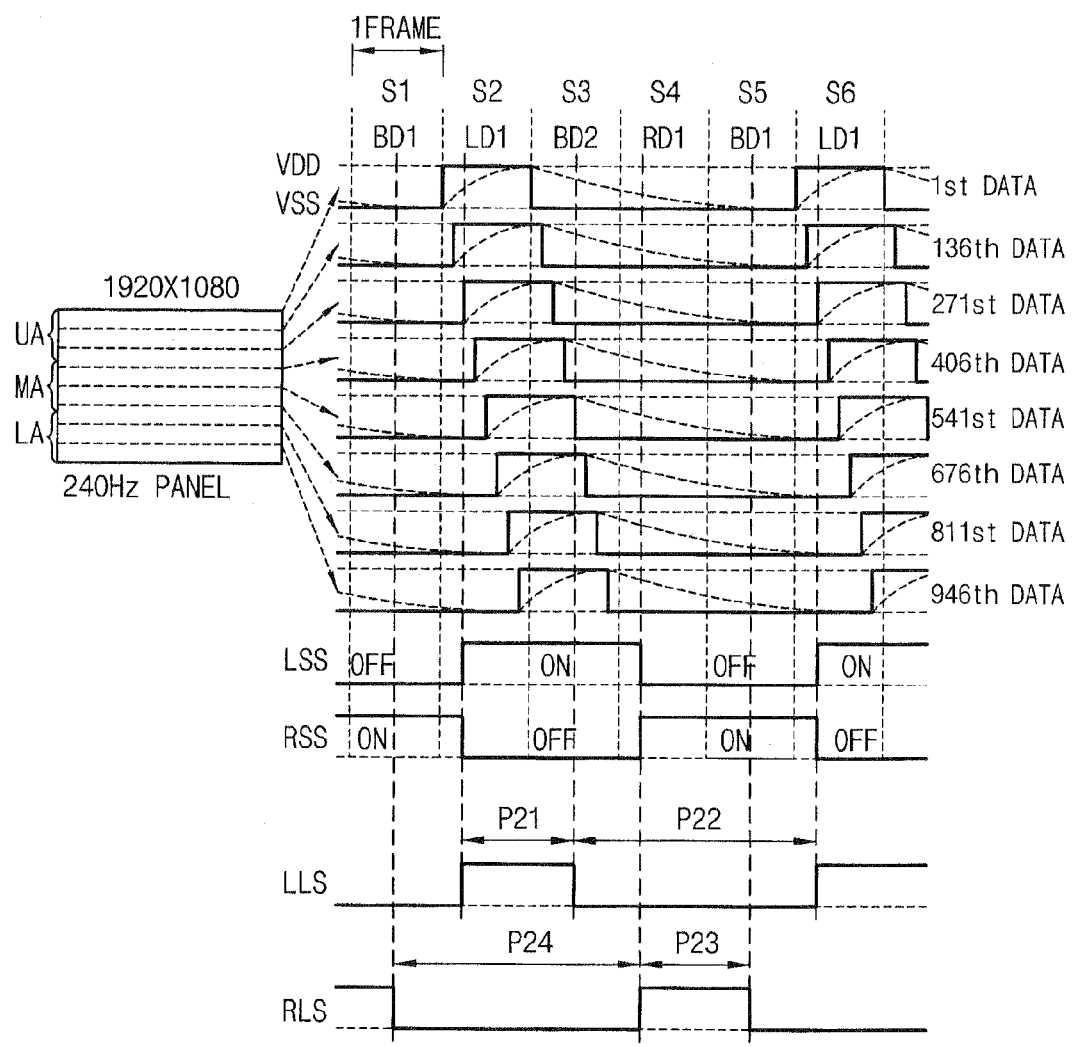
FIG. 11 is a conceptual view for describing a method of driving a display apparatus according to an example embodiment.

FIG. 11 is a conceptual view for describing a method of driving a display apparatus according to an example embodiment.

Referring to FIGS. 1 and 11, the display panel 100 may have a resolution of 1920×1080. The panel driving part 170 provides the display panel 100 with a first left-eye data frame LD1, a first black data frame BD1, a first right-eye data frame RD1, and a second black data frame BD2 using first and second left-eye data frames LD1 and LD2 and first and second right-eye data frames RD1 and RD2 that each have a frequency of 240 Hz and are corrected by the color data correcting unit 150. According to an example embodiment, the first left-eye data frame LD1 corresponds to a white data frame image, and the first right-eye data frame RD1 corresponds to a black data frame image.

The panel driving part 170 provides the display panel 100 with data of the first black data frame BD1 during a first sub interval S1, data of the first left-eye data frame LD1 during a second sub interval S2, data of the second black data frame BD2 during a third sub interval S3, and data of the first right-eye data frame RD1 during a fourth sub interval S4.

The display panel 100 displays an image corresponding to the data. The image display is delayed by a liquid crystal response time from when the data is applied to the display panel 100.

Assuming that there is negligible or no delay between the application of the data and the image display, when dividing the third sub interval S3 into early, middle, and latter parts, a left-eye image corresponding to the first left-eye data frame LD1 that is a previous frame is converted to a black image corresponding to the second black data frame BD2 in an upper area UA of the display panel 100, and the left-eye image of the previous frame is displayed in middle and lower areas MA and LA of the display panel 100 during the early part of the third sub interval S3. The black image is displayed in the upper area UA of the display panel 100, the left-eye image is converted to the black image in the middle area MA, and the left-eye image of the previous frame is displayed in the lower area LA during the middle part of the third sub interval S3. The black image is displayed in the upper and middle areas UA and MA of the display panel 100, and the left-eye image of the previous frame is converted to the black image in the lower area LA during the latter part of the third sub interval S3.

The display panel 100 displays a left-eye image during a first interval P21, displays right-eye and mixed images during a second interval P22, displays the right-eye image during a third interval P23, and displays the left-eye and mixed images during a fourth interval P14. The first to fourth intervals P21, P22, P23, and P24 may be set differently according to the liquid crystal response time.

A black image is inserted between the first left-eye image and the first right-eye image, so that the display panel 100 displaying the first left-eye image is reset to the black image. Thus, in the case that data of the first right-eye image is black which is the worst case of crosstalk occurs a lot, one more frame is secured for a falling response time of liquid crystal molecules, and thus the first interval or third interval P21 or P23 in which the left-eye image or right-eye image is displayed on the display panel 100 may be increased. According to a characteristic of a slow falling response of the liquid crystal molecules, the second interval or fourth interval P22 or P24 in which the first left-eye image (or the first right-eye image) is converted to the first right-eye image (or the first left-eye image) may be shortened.

The light source driving part 230 generates a left-eye light source signal LLS and a right-eye light source signal RLS. The left-eye light source signal LLS is at a high level during the first interval P21 in which the left-eye image is displayed on the display panel 100, and is at a low level during the second interval P22 in which the right-eye image and mixed image are displayed on the display panel 100. The right-eye light source signal RLS is at a high level during the third interval P23 in which the right-eye image is displayed on the display panel 100, and is at a low level during the fourth interval P24 in which the left-eye image and mixed image are displayed on the display panel 100.

The light source part 200 provides the display panel 100 with a left-eye light during the first interval P21, and blocks the left-eye light during the second interval P22. The light source part 200 provides the display panel 100 with a right-eye light during the third interval P23, and blocks the right-eye light during the fourth interval P24. Therefore, the light source part 200 provides the display panel 100 with the left-eye light or right-eye light during the interval in which the left-eye image or right-eye image is displayed on the display panel 100, and does not provide the display panel 100 with the left-eye light or right-eye light during the interval in which the mixed image is displayed on the display panel 100.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level from a partial section of the second sub interval S2 to a partial section of the third sub interval S3 in which the left-eye image is displayed on the display panel 100, and is at a low level during a period from a partial section of the fourth sub interval S4 to a partial section of the fifth sub interval S5 in which the right-eye image is displayed on the display panel 100. The right-eye shutter signal RSS is at a low level during the period from a partial section of the second sub interval S2 to a partial section of the third sub interval S3, and is at a high level during the period from a partial section of the fourth sub interval S4 to a partial section of the fifth sub interval S5. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 200 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

Figure 12:
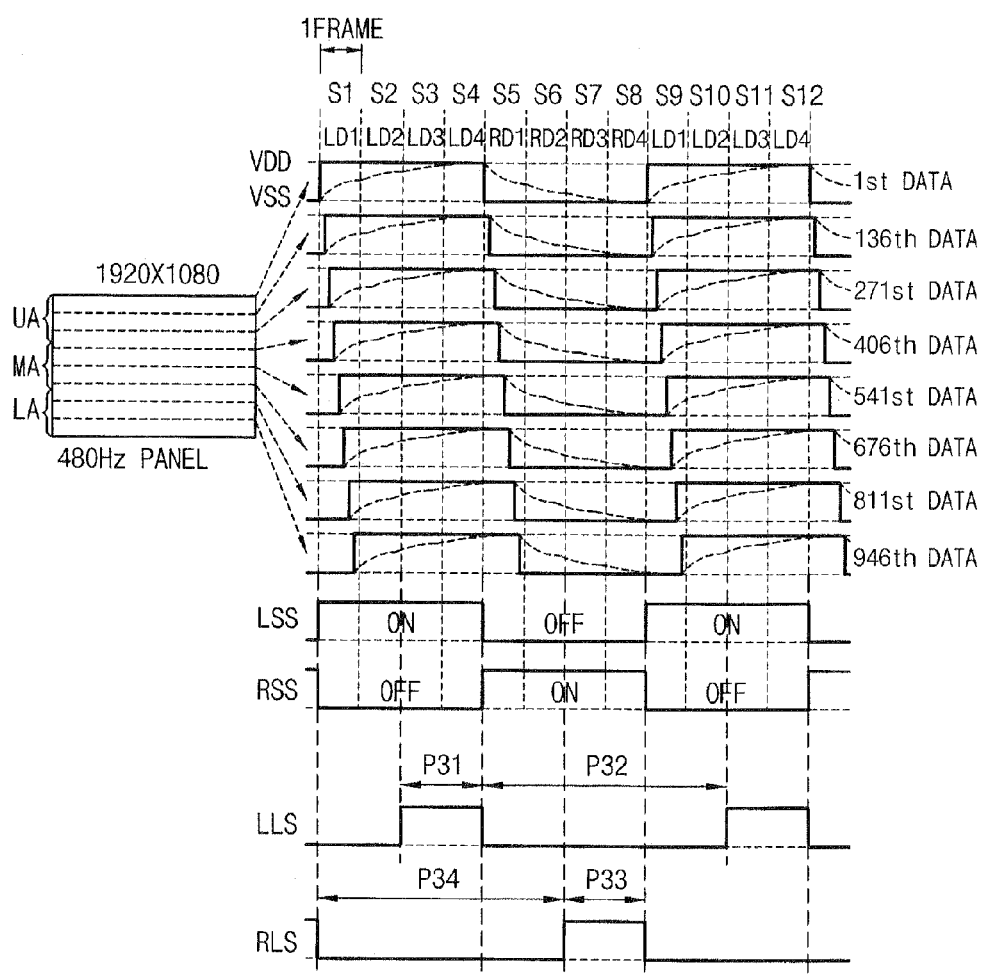
FIG. 12 is a conceptual view for describing a method of driving a display apparatus according to an example embodiment.

FIG. 12 is a conceptual view for describing a method of driving a display apparatus according to an example embodiment.

Referring to FIGS. 1 and 12, the display panel 100 has a resolution of 1920×1080. The panel driving part 170 provides the display panel 100 with first, second, third, and fourth left-eye data frames LD1, LD2, LD3, and LD4 and first, second, third, and fourth right-eye data frames RD1, RD2, RD3 and RD4 that each have a frequency of 480 Hz and are corrected by the color data correcting unit 150. Accordingly, a sub interval in which the panel driving part 170 provides the display panel 100 with a data frame is about 2 ms, and a main interval in which data frames of a stereoscopic image LD1, LD2, LD3, LD4, RD1, RD2, RD3, and RD4 are provided to the display panel 100 may be about 16 ms.

The panel driving part 170 provides the display panel 100 with data of the first left-eye data frame LD1 during a first sub interval S1, data of the second left-eye data frame LD2 during a second sub interval S2, data of the third left-eye data frame LD3 during a third sub interval S3, data of the fourth left-eye data frame LD4 during a fourth sub interval S4, data of the first right-eye data frame RD1 during a fifth sub interval S5, data of the second right-eye data frame RD2 during a sixth sub interval S6, data of the third right-eye data frame RD3 during a seventh sub interval S7, and data of the fourth right-eye data frame RD4 during an eighth sub interval S8.

The display panel 100 displays an image corresponding to the data. The image display is delayed by a liquid crystal response time from when the data is applied to the display panel 100.

Assuming that there is negligible or no delay between the application of the data and the image display, when dividing the fifth sub interval S5 into early, middle, and latter parts, a left-eye image corresponding to the fourth left-eye data frame LD4 of the previous frame is converted to a right-eye image corresponding to the first right-eye data frame RD1 of the present frame in an upper area UA of the display panel 100, and the left-eye image of the previous frame is displayed in middle and lower areas MA and LA during the early part of the fifth sub interval S5. The right-eye image is displayed in the upper area UA of the display panel 100, the left-eye image is converted to the right-eye image in the middle area MA, and the left-eye image of the previous frame is displayed in the lower area LA during the middle part of the fifth sub interval S5. The right-eye image is displayed in the upper and middle areas UA and MA of the display panel 100, and the left-eye image of the previous frame is converted to the right-eye image in the lower area LA during the latter part of the fifth sub interval S5.

The display panel 100 displays a left-eye image during a first interval P31, displays right-eye and mixed images during a second interval P32, displays the right-eye image during a third interval P33, and displays the left-eye and mixed images during a fourth interval P34. The first to fourth intervals P31, P32, P33, and P34 may be set differently according to the liquid crystal response time.

The light source driving part 230 generates a left-eye light source signal LLS and a right-eye light source signal RLS. The left-eye light source signal LLS is at a high level during the first interval P31 in which the left-eye image is displayed on the display panel 100, and is at a low level during the second interval P32 in which the right-eye and mixed images are displayed on the display panel 100. The right-eye light source signal RLS is at a high level during the third interval P33 in which the right-eye image is displayed on the display panel 100, and is at a low level during the fourth interval P34 in which the left-eye and mixed images are displayed on the display panel 100.

The light source part 200 provides the display panel 100 with a left-eye light during the first interval P31, and blocks the left-eye light during the second interval P32. The light source part 200 provides the display panel 100 with a right-eye light during the third interval P33, and blocks the right-eye light during the fourth interval P34.

Based on a left-eye shutter signal LSS and a right-eye shutter signal RSS synchronized with driving of the display panel 100, the glasses part 300 opens and closes the left-eye shutter 310 and the right-eye shutter 320. For example, the left-eye shutter signal LSS opens the left-eye shutter 310 during a period from the first sub interval S1 to the fourth sub interval S4 including the first interval P31 in which the left-eye image is displayed on the display panel 100 and closes the left-eye shutter 310 during a period from the fifth sub interval S5 to the eighth sub interval S8 including part of the second interval P32 in which the right-eye image is displayed on the display panel 100. The right-eye shutter signal RSS closes the right-eye shutter 320 during the period from the first sub interval S1 to the fourth sub interval S4 including the first interval P31 in which the left-eye image is displayed on the display panel 100 and opens the right-eye shutter 320 during the period from the fifth sub interval S5 to the eighth sub interval S8 including part of the second interval P32 in which the right-eye image is displayed on the display panel 100.

Since the light source part 200 provides a light to the display panel 100 only when the interval in which the left-eye image or right-eye image is displayed on the display panel 100, no crosstalk is perceived between the left-eye image and the right-eye image.

Figure 13:
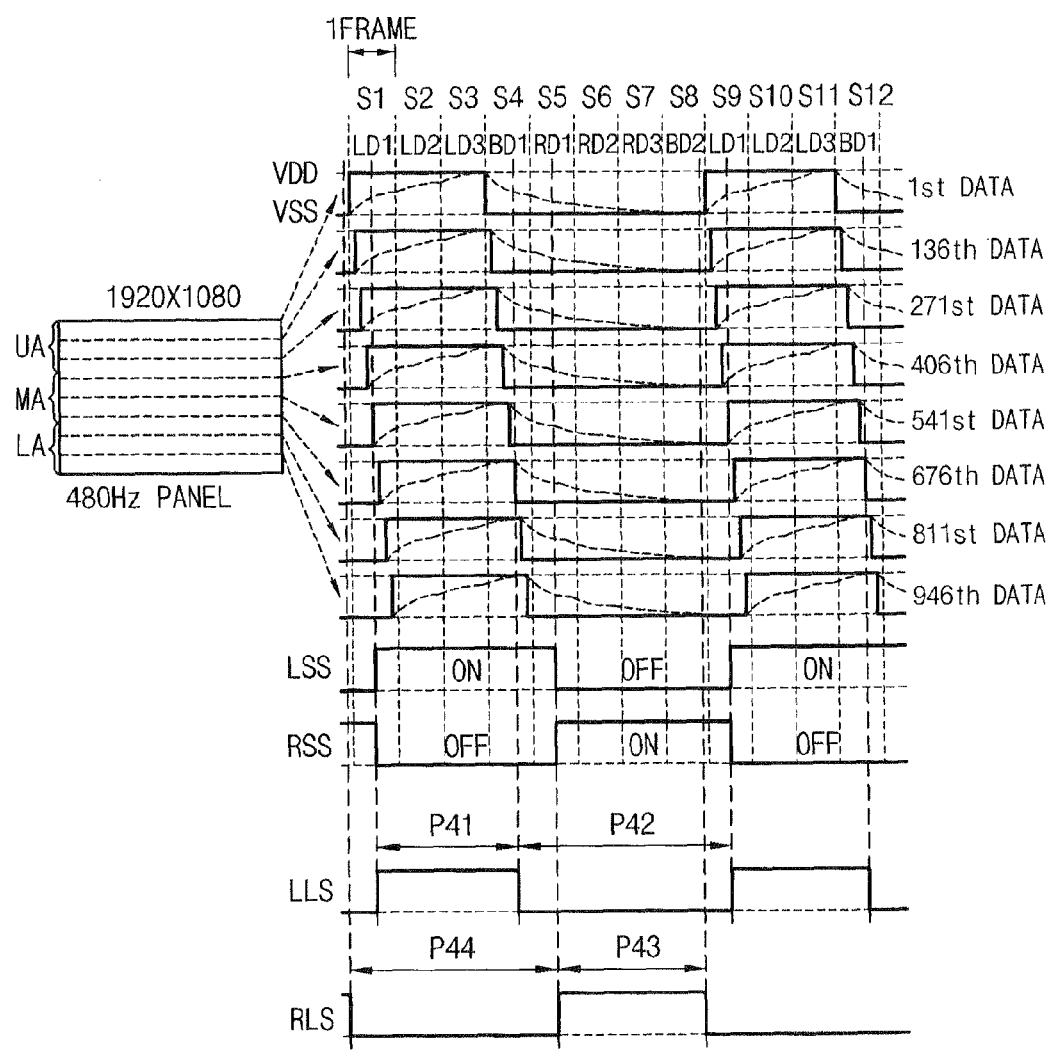
FIG. 13 is a conceptual view for describing a method of driving a display apparatus according to an example embodiment.

FIG. 13 is a conceptual view for describing a method of driving a display apparatus according to an example embodiment.

Referring to FIGS. 1 and 13, the display panel 100 has a resolution of 1920×1080. The panel driving part 170 provides the display panel 100 with first, second, and third left-eye data frames LD1, LD2, and LD3, a first black data frame BD1, first, second, third right-eye data frames RD1, RD2, and RD3, and a second black data frame BD2 using first, second, third, and fourth left-eye data frames LD1, LD2, LD3, and LD4 and first, second, third, and fourth right-eye data frames RD1, RD2, RD3, and RD4 that each have a frequency of 480 Hz and are corrected by the color data correcting unit 150.

The panel driving part 170 provides the display panel 100 with data of the first left-eye data frame LD1 during a first sub interval S1, data of the second left-eye data frame LD2 during a second sub interval S2, data of the third left-eye data frame LD3 during a third sub interval S3, data of the first black data frame BD1 during a fourth sub interval S4, data of the first right-eye data frame RD1 during a fifth sub interval S5, data of the second right-eye data frame RD2 during a sixth sub interval S6, data of the third right-eye data frame RD3 during a seventh sub interval S7, and data of the second black data frame BD2 during an eighth sub interval S8.

The display panel 100 displays an image corresponding to the data. The image display is delayed by a liquid crystal response time from when the data is applied to the display panel 100. Therefore, according to the liquid crystal response time, the display panel 100 has intervals displaying a mixed image of left-eye and right-eye images.

Assuming that there is negligible or no delay between the application of the data and the image display, in the fourth sub interval S4, a third left-eye image corresponding to the third left-eye data frame LD3 of the previous frame is converted to a first black image corresponding to the first black data frame BD1 of the present frame in an upper area UA of the display panel 100, and the third left-eye image of the previous frame is displayed in middle and lower areas MA and LA during the early part of the fourth sub interval S4. The first black image is displayed in the upper area UA of the display panel 100, the third left-eye image is converted to the first black image in the middle area MA, and the third left-eye image is displayed in the lower area LA during the middle part of the fourth sub interval S4. The first black image is displayed in the upper and middle areas UA and MA of the display panel 100, and the third left-eye image is converted to the first black image in the lower area LA during the latter part of the fourth sub interval S4. Accordingly, the display panel 100 displays a left-eye image during a first interval P41, displays right-eye and mixed images during a second interval P42, displays the right-eye image during a third interval P43, and displays the left-eye and mixed images during a fourth interval P44. The first to fourth intervals P41, P42, P43, and P44 may be set differently according to the liquid crystal response time.

The first black image is inserted between the first left-eye image and the first right-eye image, and the display panel 100 displaying the first left-eye image is reset to a black image, so that in the case that data of the first right-eye image is black which is the worst case of crosstalk, one more frame is secured for a falling response time of liquid crystal molecules, and thus the first interval or third interval P41 or P43 in which the left-eye image or right-eye image is displayed on the display panel 100 may be increased. According to a characteristic of a slow falling response of the liquid crystal molecules, the second interval or fourth interval P42 or P44 in which the first left-eye image (or the first right-eye image) is converted to the first right-eye image (or the first left-eye image) may be shortened.

The light source driving part 230 generates a left-eye light source signal LLS and a right-eye light source signal RLS. The left-eye light source signal LLS is at a high level during the first interval P41 in which the left-eye image is displayed on the display panel 100, and is at a low level during the second interval P42 in which the right-eye and mixed images are displayed on the display panel 100. The right-eye light source signal RLS is at a high level during the third interval P43 in which the right-eye image is displayed on the display panel 100, and is at a low level during the fourth interval P44 in which the left-eye and mixed images are displayed on the display panel 100.

The light source part 200 provides the display panel 100 with a left-eye light during the first interval P41 and blocks the left-eye light during the second interval P42. The light source part 200 provides the display panel 100 with a right-eye light during the third interval P43 and blocks the right-eye light during the fourth interval P44.

Based on a left-eye shutter signal LSS and a right-eye shutter signal RSS synchronized with driving of the display panel 100, the glasses part 300 opens and closes the left-eye shutter 310 and the right-eye shutter 320. For example, the left-eye shutter signal LSS opens the left-eye shutter 310 during a period from a partial section of the first sub interval S1 to a partial section of the fifth sub interval S5 including the first interval P41 in which the left-eye image is displayed on the display panel 100 and closes the left-eye shutter 310 during a period from a partial section of the fifth sub interval S5 to a partial section of a ninth sub interval S9 including the third interval P43 in which the right-eye image is displayed on the display panel 100. The right-eye shutter signal RSS closes the right-eye shutter 320 during the period from a partial section of the first sub interval S1 to a partial section of the fifth sub interval S5 including the first interval P41 in which the left-eye image is displayed on the display panel 100 and opens the right-eye shutter 320 during the period from a partial section of the fifth sub interval S5 to a partial section of the ninth sub interval S9 including the third interval P43 in which the right-eye image is displayed on the display panel 100.

Since the light source part 200 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

Figure 14:
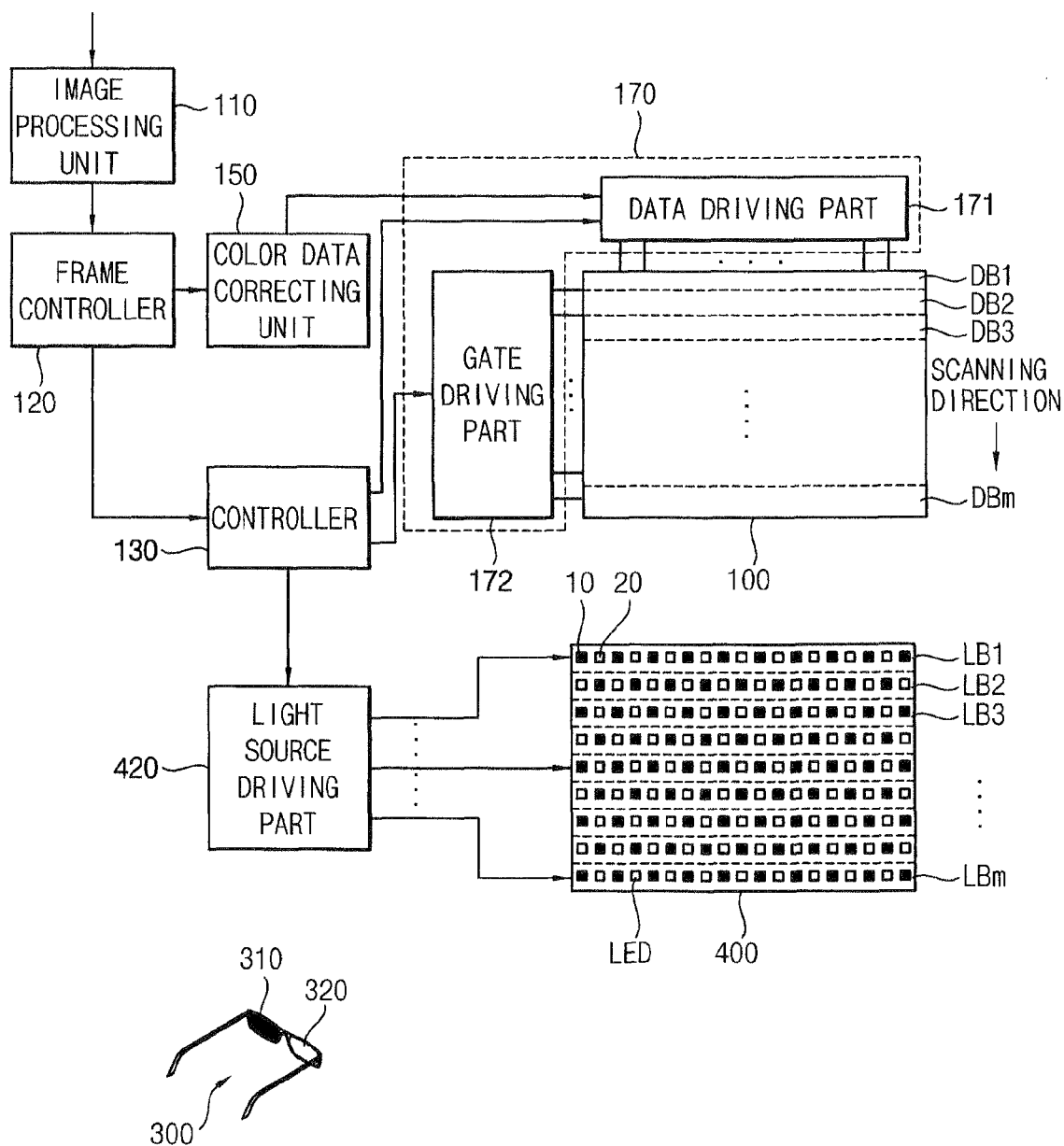
FIG. 14 is a block diagram illustrating a display apparatus according to an example embodiment.
Figure 15A:
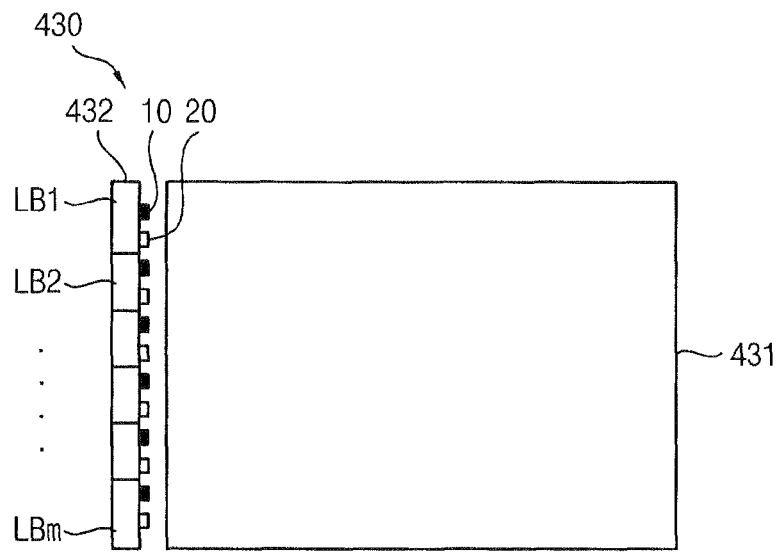
FIGS. 15A and 15B are block diagrams illustrating various example embodiments for the light source part described in connection with FIG. 14.
Figure 15B:
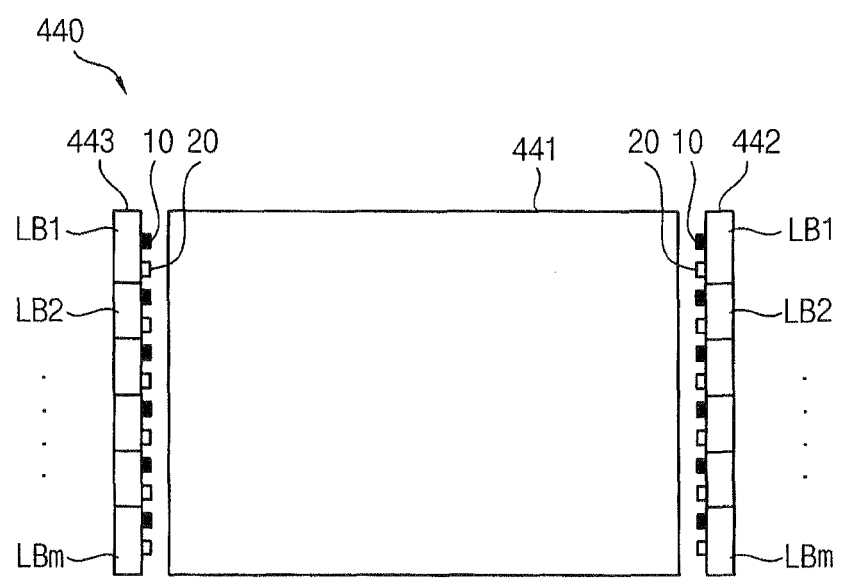

FIG. 14 is a block diagram illustrating a display apparatus according to an example embodiment of the present invention. FIGS. 15A and 15B are block diagrams illustrating various example embodiments for the light source part described in connection with FIG. 14.

Referring to FIG. 14, the display apparatus includes an image processing unit 110, a frame controller 120, a controller 130, a color data correcting unit 150, display panel 100, a panel driving part 170, a light source part 400, a light source driving part 420, and a glasses part 300.

The display apparatus is the same or substantially the same as the display apparatus shown in FIG. 1 except for the light source part 400 and the light source driving part 420.

The light source part 400 includes a plurality of left-eye light sources 10 and a plurality of right-eye light sources 20. The light source part 400 has a direct-type structure that is placed under the display panel 100. The light source part 400 includes a plurality of light emitting blocks LB1, LB2, LB3, . . . , and LBm arranged in a scanning direction. According to an example embodiment, 'm' is a natural number. According to an embodiment, the light source part 400 may include fluorescent lamps that generate a left-eye light and a right-eye light, wherein the fluorescent lamps may be arranged in the scanning direction corresponding to the light emitting blocks.

According to embodiments, the display apparatus may include the light source parts shown in FIGS. 15A and 15B. The light source part 430 shown in FIG. 15A includes a light guide plate 431 and a light emitting module 432 on a short side of the light guide plate 431. The light emitting module 432 includes a plurality of left-eye light sources 10 and a plurality of right-eye light sources 20. The light emitting module 432 includes a plurality of light emitting blocks LB1, LB2, LB3, . . . , and LBm arranged in the scanning direction.

The light source part 440 shown in FIG. 15B includes a light guide plate 441, a first light emitting module 442 on a first short side of the light guide plate 441, and a second light emitting module 443 on a second short side of the light guide plate 441. The first light emitting module 442 includes a plurality of left-eye light sources 10 and a plurality of right-eye light sources 20, and includes m light emitting blocks LB1, LB2, LB3, . . . , and LBm arranged in the scanning direction. The second light emitting module 443 includes a plurality of left-eye light sources 10 and a plurality of right-eye light sources 20, and includes m light emitting blocks LB1, LB2, LB3, . . . , and LBm that respectively face the light emitting blocks LB1, LB2, LB3, . . . , and LBm of the first light emitting module 442. The light emitting blocks LB1, LB2, LB3, . . . , and LBm of the second light emitting module 443 are driven in synchronization with the respective corresponding light emitting blocks LB1, LB2, LB3, . . . , and LBm of the first light emitting module 442. For example, the first light emitting block LB1 of the first light emitting module 442 and the first light emitting block LB1 of the second light emitting module 443 are synchronized with each other when driven by a light source driving signal.

The light source driving part 420 generates m left-eye light source signals, such as a first to an M-th left-eye light source signals and m right-eye light source signals, such as a first to an M-th right-eye light source signals that correspond to the m light emitting blocks LB1, LB2, LB3, . . . , and LBm. For example, the display panel includes m display blocks DB1, DB2, DB3, . . . , and DBm corresponding to the m light emitting blocks LB1, LB2, LB3, . . . , and LBm. The light source driving part 420 generates first left-eye and right-eye light source signals that respectively turns on the left-eye sources 10 of the first light emitting block LB1 and turns off the right-eye light sources 20 of the first light emitting block LB1 while the left-eye image is displayed on the first display block DB1 corresponding to the first light emitting block LB1.

Figure 16:
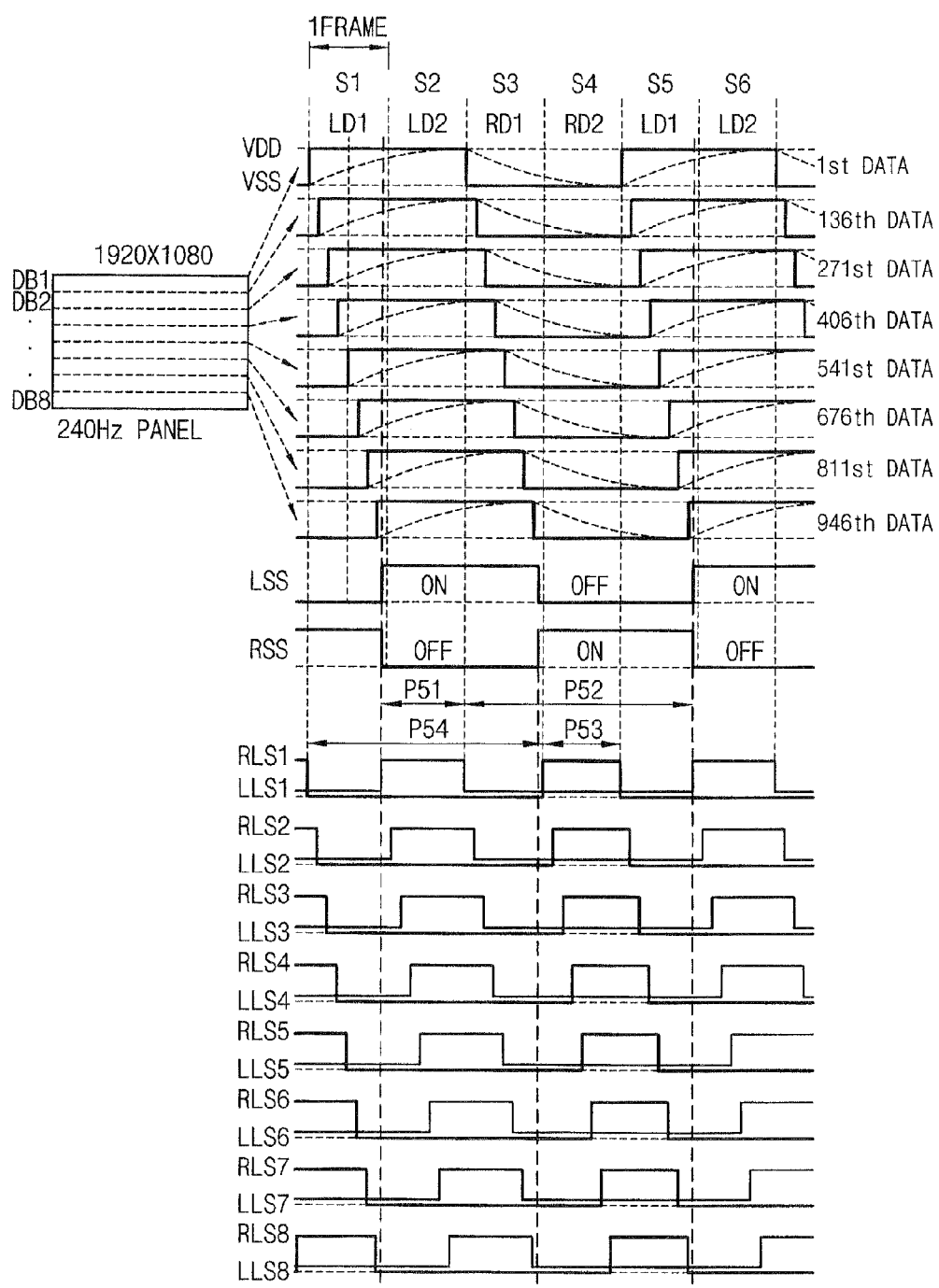
FIG. 16 is a conceptual view for describing a method of driving the display apparatus described in connection with FIG. 14.

FIG. 16 is a conceptual view for describing a method of driving the display apparatus described in connection with FIG. 14.

Referring to FIGS. 14 and 16, the display panel 100 may have a resolution of 1920×1080. The panel driving part 170 provides the display panel 100 with data of first and second left-eye data frames LD1 and LD2 of 240 Hz and data of first and second right-eye data frames RD1 and RD2 that each have a frequency of 240 Hz and are corrected by the color data correcting unit 150. A sub interval in which the panel driving part 170 outputs a data frame to the display panel 100 is about 4 ms, and a main interval in which data frames LD1, LD2, RD1, and RD2 of a stereoscopic image are displayed on the display panel 100 may be about 16 ms. Therefore, the display panel may be driven with a frame frequency of about 240 Hz.

The panel driving part 170 provides the display panel 100 with data of the first left-eye data frame LD1 during a first sub interval S1, data of the second left-eye data frame LD2 during a second sub interval S2, data of the first right-eye data frame RD1 during a third sub interval S3, and data of the second right-eye data frame RD2 during a fourth sub interval S4.

In a first horizontal line included in a first display block DB1 of the display panel 100, data of the first and second left-eye data frames LD1 and LD2 are provided during the first and second sub intervals S1 and S2, respectively, and data of the first and second right-eye data frames RD1 and RD2 are provided during the third and fourth sub intervals S3 and S4, respectively. The first display block DB1 displays an image corresponding to the data. The image display is delayed by a liquid crystal response time from when the data is applied to the display panel 100. Therefore, according to the liquid crystal response time, the first display block DB1 has intervals displaying a mixed image of a left-eye image corresponding to the first and second left-eye data frames LD1 and LD2, and a right-eye image corresponding to the first and second right-eye data frames RD1 and RD2.

The first horizontal line displays the left-eye image during a period from a partial section of the first sub interval S1 to a partial section of the second sub interval S2, and displays the mixed image and left-eye image during a period from a partial section of the second sub interval S2 to a partial section of the fourth sub interval S4. The first horizontal line displays the mixed image and left-eye image during a period from a partial section of the previous interval of the first sub interval S1 to a partial section of the third sub interval S3, and displays the right-eye image during a period from a partial section of the third sub interval S3 to a partial section of the fourth sub interval S4. The first display block DB1 displays the left-eye image during a first interval P51, displays the right-eye and mixed images during a second interval P52, displays the right-eye image during a third interval P53, and displays the left-eye and mixed images during a fourth interval P54. The first to fourth intervals P51, P52, P53, and P54 may be set differently according to the liquid crystal response time.

In synchronization with a driving interval of the first display block DB1, the light source driving part 420 generates first left-eye and right-eye light source signals LLS1 and RLS1 to be provided to the first light emitting block LB1 corresponding to the first display block DB1. The first left-eye light source signal LLS1 is at a high level during the first interval P51 in which the first display block DB1 displays the left-eye image, and is at a low level during the second interval P52 in which the first display block DB1 displays the right-eye and mixed images. The first right-eye light source signal RLS1 is at a high level during the third interval P53 in which the first display block DB1 displays the right-eye image, and is at a low level during the fourth interval P54 in which the first display block DB1 displays the left-eye and mixed images.

Accordingly, the light source driving part 420 generates second to eighth left-eye light source signals LLS2, LLS3, . . . , and LLS8 and second to eighth right-eye light source signals RLS2, RLS3, . . . , and RLS8 synchronized with images displayed on the second to eighth display blocks DB1, DB2, . . . , and DB8, respectively, and then provides the light source signals to the second to eighth light emitting blocks LB1, LB2, . . . , and LB8.

According to an example embodiment, the left-eye light source signal or right-eye light source signal for controlling the light emitting blocks is generated in synchronization with an image displayed on a first horizontal line of each of the display blocks. Alternately, the light source signals may be generated in synchronization with an image displayed on the middle horizontal line or the last horizontal line of a plurality of horizontal lines in the display block. For example, the light source signal for controlling the light emitting block may be generated to be synchronized with the image displayed on the display block.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level during a period from a partial section of the first sub interval S1 to a partial section of the third sub interval S3 in which the left-eye image is displayed on the display panel 100, and is at a low level during a period from a partial section of the third sub interval S3 to a partial section of the fifth sub interval S5 in which the right-eye image is displayed on the display panel 100. The right-eye shutter signal RSS is at a low level during the period from a partial section of the first sub interval S1 to a partial section of the third sub interval S3, and is at a high level during the period from a partial section of the third sub interval S3 to a partial section of the fifth sub interval S5. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 200 provides a light to the display panel 100 only when the left-eye image or right-eye image is displayed on the display panel 100, no crosstalk is perceived between the left-eye image and the right-eye image.

Figure 17:
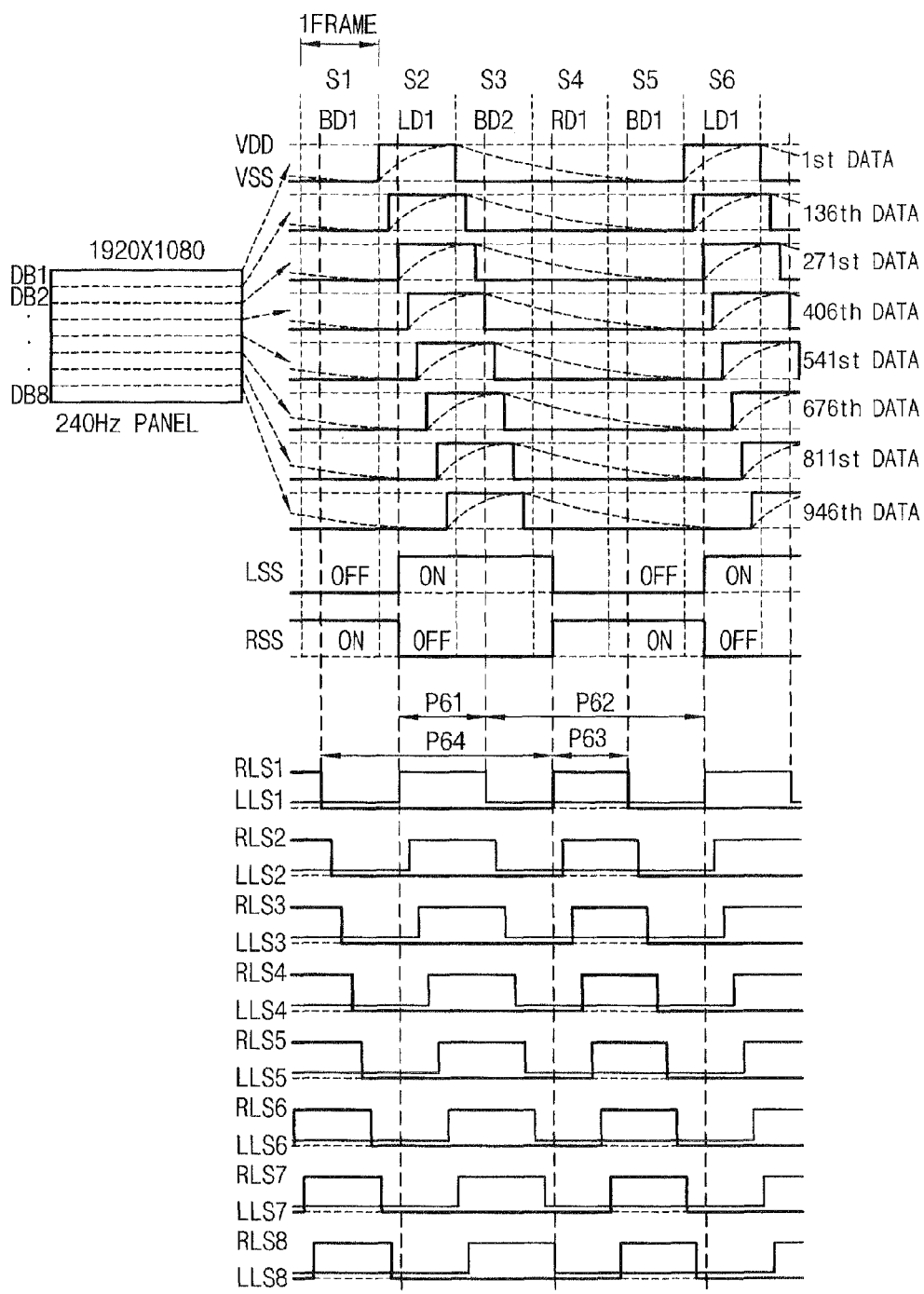
FIG. 17 is a conceptual view for describing a method of driving a display apparatus according to an example embodiment.

FIG. 17 is a conceptual view for describing a method of driving a display apparatus according to an example embodiment.

Referring to FIGS. 14 and 17, the display panel 100 may have a resolution of 1920×1080. The panel driving part 170 provides the display panel 100 with a first left-eye data frame LD1, a first black data frame BD1, a first right-eye data frame RD1, and a second black data frame BD2 using data of first and second left-eye data frames LD1 and LD2 and data of first and second right-eye data frames RD1 and RD2 that each have a frequency of 240 Hz and are corrected by the color data correcting unit 150.

In a first horizontal line included in a first display block DB1 of the display panel 100, data of the first black data frame BD1 are provided during the first sub intervals S1, data of the first left-eye data frames LD1 are provided during the second sub intervals S2, data of the second black data frame BD2 are provided during the third sub intervals S3, and data of the first right-eye data frames RD1 are provided during the fourth sub intervals S4.

In the first horizontal line, a right-eye image of a previous frame is converted to a black image corresponding to the first black data frame BD1 during the first sub interval S1, a left-eye image corresponding to the first left-eye data frame LD1 is displayed during a period from a partial section of the second sub interval S2 to a partial section of the third sub interval S3, the left-eye image is converted to a black image corresponding to the second black data frame BD2 during a period from a partial section of the third sub interval S3 to a partial section of the fourth sub interval S4, and a right-eye image corresponding to the first right-eye data frame RD1 is displayed during a period from a partial section of the fourth sub interval S4 to a partial section of the fifth sub interval S5.

The first display block DB1 displays the left-eye image during a first interval P61, and displays a mixed image of left-eye and black images, and a right-eye image during a second interval P62, and displays the right-eye image during a third interval P63, and displays a mixed image of the right-eye and black images, and the left-eye image during a fourth interval P64. The first to fourth intervals P61, P62, P63, and P64 may be set differently according to the liquid crystal response time.

In synchronization with a driving interval of the first display block DB1, the light source driving part 420 generates first left-eye and right-eye light source signals LLS1 and RLS1 to be provided to the first light emitting block LB1 corresponding to the first display block DB1. The first left-eye light source signal LLS1 is at a high level during the first interval P61 in which the first display block DB1 displays the left-eye image, and is at a low level during the second interval P62 in which the first display block DB1 displays the right-eye and mixed images. The first right-eye light source signal RLS1 is at a high level during the third interval P63 in which the first display block DB1 displays the right-eye image, and is at a low level during the fourth interval P64 in which the first display block DB1 displays the left-eye and mixed images.

Accordingly, the light source driving part 420 generates second to eighth left-eye light source signals LLS2, LLS3, ..., and LLS8 and second to eighth right-eye light source signals RLS2, RLS3, ..., and RLS8 synchronized with images displayed on the second to eighth display blocks DB1, DB2, ..., and DB8, respectively, and then provides the light source signals to the second to eighth light emitting blocks LB1, LB2, ..., and LB8.

According to an example embodiment the left-eye light source signal or right-eye light source signal for controlling the light emitting blocks is generated in synchronization with an image displayed on a first horizontal line of each of the display blocks. Alternately, the light source signals may be generated in synchronization with an image displayed on the middle horizontal line or the last horizontal line of a plurality of horizontal lines. For example, the light source signal for controlling the light emitting block may be generated to be synchronized with the image displayed on the display block.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level during a period from a partial section of the second sub interval S2 to a partial section of the fourth sub interval S4 in which the left-eye image is displayed on the display panel 100, and is at a low level during a period from a partial section of the fourth sub interval S4 to a partial section of the sixth sub interval S6 in which the right-eye image is displayed on the display panel 100. The right-eye shutter signal RSS is at a low level during the period from a partial section of the second sub interval S2 to a partial section of the fourth sub interval S4, and is at a high level during the period from a partial section of the fourth sub interval S4 to a partial section of the sixth sub interval S6. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 400 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

Figure 18:
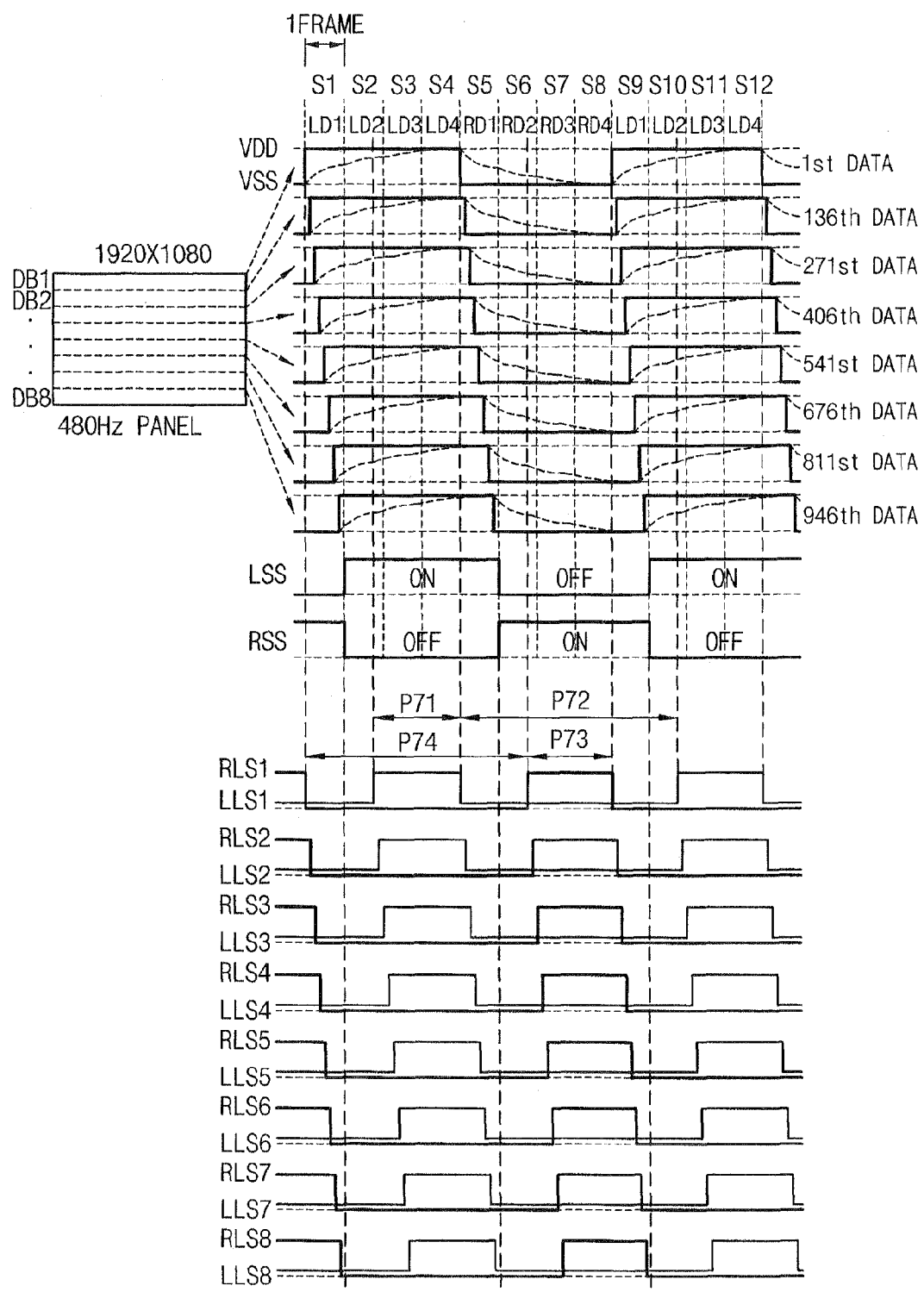
FIG. 18 is a conceptual view for describing a method of driving a display apparatus according to an example embodiment.

FIG. 18 is a conceptual view for describing a method of driving a display apparatus according to an example embodiment.

Referring to FIGS. 14 and 18, the display panel 100 may have a resolution of 1920×1080. The panel driving part 170 provides the display panel 100 with first, second, third, and fourth left-eye data frames LD1, LD2, LD3, and LD4 and first, second, third and fourth right-eye data frames RD1, RD2, RD3, and RD4 that each have a frequency of 480 Hz and are corrected by the color data correcting unit 150. Accordingly, a sub interval in which the panel driving part 170 provides the display panel 100 with a data frame is about 2 ms, and a main interval in which data frames of a stereoscopic image LD1, LD2, LD3, LD4, RD1, RD2, RD3, and RD4 are provided to the display panel 100 may be about 16 ms.

In a first horizontal line included in a first display block DB1 of the display panel 100, data of the first, second, third, and fourth left-eye data frames LD1, LD2, LD3, and LD4 are provided during first, second, third, and fourth sub intervals S1, S2, S3, and S4, respectively, and data of the first, second, third, and fourth right-eye data frames RD1, RD2, RD3, and RD4 are provided during fifth, sixth, seventh, and eighth sub intervals S5, S6, S7, and S8, respectively.

The first horizontal line displays an image corresponding to the data. The image display is delayed by a liquid crystal response time from when the data is applied to the display panel 100. According to the liquid crystal response time, the first horizontal line displays the left-eye image during a period from a partial section of the second sub interval S2 to a partial section of the fifth sub interval S5, and displays mixed and right-eye images during a period from a partial section of the fifth sub interval S5 to a partial section of a tenth sub interval S10. The first horizontal line displays mixed and left-eye images during a period from a partial section of a previous interval of the first sub interval S1 to a partial section of the sixth sub interval S6, and displays a right-eye image during a period from a partial section of the sixth sub interval S6 to a partial section of a ninth sub interval S9.

The first display block DB1 displays the left-eye image during a first interval P71, displays the right-eye and mixed images during a second interval P72, displays the right-eye image during a third interval P73, and displays the left-eye and mixed images during a fourth interval P74. The first to fourth intervals P71, P72, P73, and P74 may be set differently according to the liquid crystal response time.

In synchronization with a driving interval of the first display block DB1, the light source driving part 420 generates first left-eye and right-eye light source signals LLS1 and RLS1 to be provided to the first light emitting block LB1 corresponding to the first display block DB1. The first left-eye light source signal LLS1 is at a high level during the first interval P71 in which the first display block DB1 displays the left-eye image, and is at a low level during the second interval P72 in which the first display block DB1 displays the right-eye and mixed images. The first right-eye light source signal RLS1 is at a high level during the third interval P73 in which the first display block DB1 displays the right-eye image, and is at a low level during the fourth interval P74 in which the first display block DB1 displays the left-eye and mixed images.

Accordingly, the light source driving part 420 generates second to eighth left-eye light source signals LLS2, LLS3, ..., and LLS8 and second to eighth right-eye light source signals RLS2, RLS3, ..., and RLS8 synchronized with images displayed on the second to eighth display blocks DB1, DB2, ..., and DB8, respectively, and then provides the light source signals to the second to eighth light emitting blocks LB1, LB2, ..., and LB8.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level during a period from a partial section of the first sub interval S1 to a partial section of the fifth sub interval S5 in which the left-eye image is displayed on the display panel 100, and is at a low level during a period from a partial section of the fifth sub interval S5 to a partial section of the ninth sub interval S9 in which the right-eye image is displayed on the display panel 100. The right-eye shutter signal RSS is at a low level during the period from a partial section of the first sub interval S1 to a partial section of the fifth sub interval S5, and is at a high level during the period from a partial section of the fifth sub interval S5 to a partial section of the ninth sub interval S9. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 400 provides a light to the display panel 100 only when the left-eye image or right-eye image is displayed on the display panel 100, no crosstalk is perceived between the left-eye image and the right-eye image.

Figure 19:
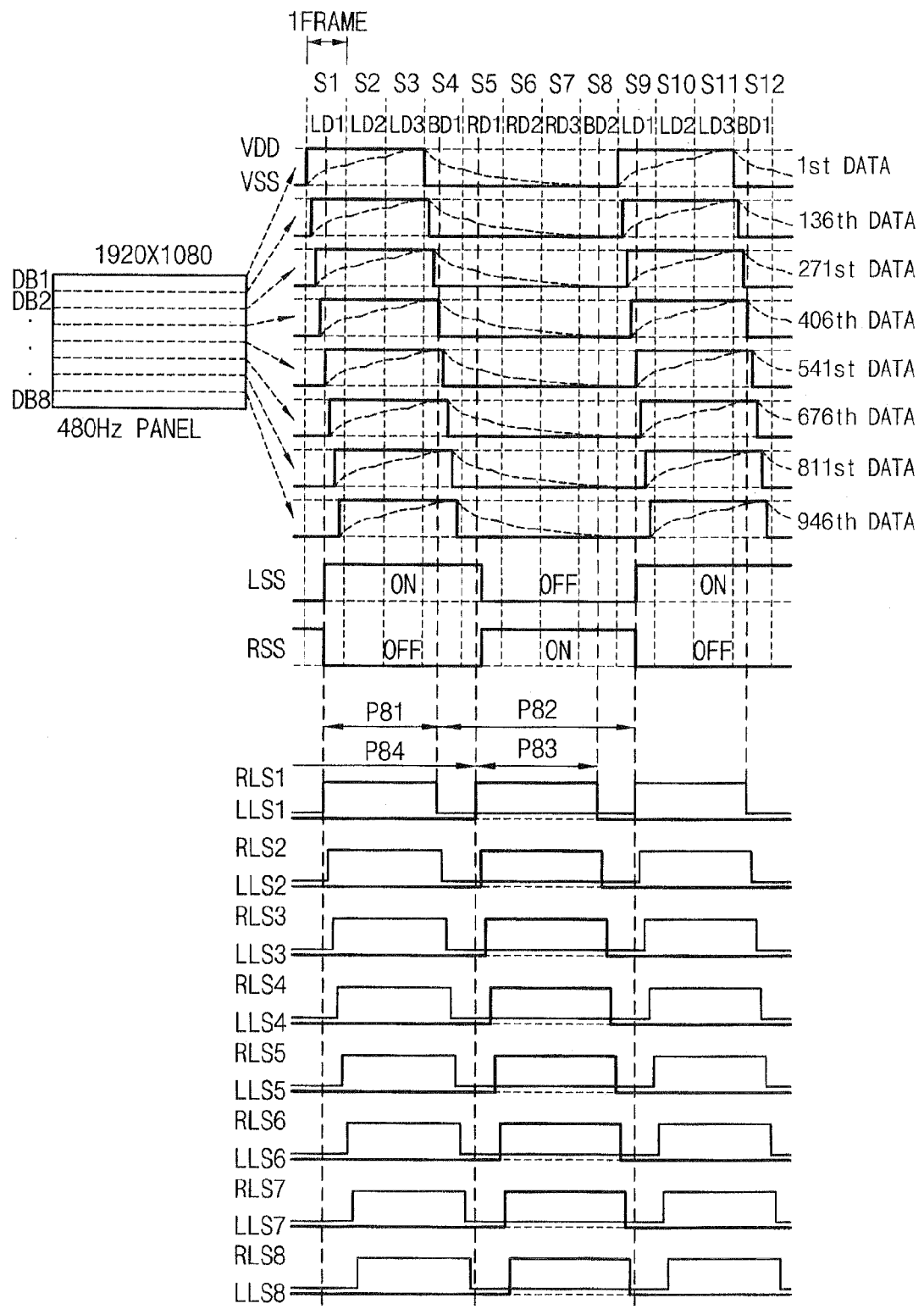
FIG. 19 is a conceptual view for describing a method of driving a display apparatus according to an example embodiment.

FIG. 19 is a conceptual view for describing a method of driving a display apparatus according to an example embodiment.

Referring to FIGS. 14 and 19, the display panel 100 may have a resolution of 1920×1080. The panel driving part 170 provides the display panel 100 with first, second, and third left-eye data frames LD1, LD2, and LD3, a first black data frame BD1, first, second, and third right-eye data frames RD1, RD2, and RD3 and a second black data frame BD2 using first, second, third, and fourth left-eye data frames LD1, LD2, LD3, and LD4 and first, second, third, and fourth right-eye data frames RD1, RD2, RD3, and RD4 that each have a frequency of 480 Hz and are corrected by the color data correcting unit 150.

In a first horizontal line included in a first display block DB1 of the display panel 100, data of the first, second, and third left-eye data frames LD1, LD2, and LD3 are provided during first, second, and third sub intervals S1, S2, and S3, respectively, data of the black data frame BD1 is provided during the fourth sub interval S4, data of the first, second, and third right-eye data frames RD1, RD2, and RD3 are provided during fifth, sixth, and seventh sub intervals S5, S6, and S7, respectively, and data of the second black data frame BD2 is provided during an eighth sub interval S8.

The first horizontal line displays an image corresponding to the data. The image display is delayed by a liquid crystal response time from when the data is applied to the display panel 100. According to the liquid crystal response time, the first horizontal line displays the left-eye image during a period from a partial section of the first sub interval S1 to a partial section of the fourth sub interval S4, and displays a mixed image of left-eye and black images, and right-eye image during a period from a partial section of the fourth sub interval S4 to a partial section of a ninth sub interval S9. The first horizontal line displays a mixed image of right-eye and black images, and a left-eye image during a period from a partial section of a previous interval of the first sub interval S1 to a partial section of the fifth sub interval S5, and displays a right-eye image during a period from a partial section of the fifth sub interval S5 to a partial section of the eighth sub interval S8.

The first display block DB1 displays the left-eye image during a first interval P81, displays the right-eye and mixed images during a second interval P82, displays the right-eye image during a third interval P83, and displays the left-eye and mixed images during a fourth interval P84. The first to fourth intervals P81, P82, P83, and P84 may be set differently according to the liquid crystal response time.

In synchronization with a driving interval of the first display block DB1, the light source driving part 420 generates first left-eye and right-eye light source signals LLS1 and RLS1 to be provided to the first light emitting block LB1 corresponding to the first display block DB1. The first left-eye light source signal LLS1 is at a high level during the first interval P81 in which the first display block DB1 displays the left-eye image, and is at a low level during the second interval P82 in which the first display block DB1 displays the right-eye and mixed images. The first right-eye light source signal RLS1 is at a high level during the third interval P83 in which the first display block DB1 displays the right-eye image, and is at a low level during the fourth interval P84 in which the first display block DB1 displays the left-eye and mixed images.

Accordingly, the light source driving part 420 generates second to eighth left-eye light source signals LLS2, LLS3, ..., and LLS8 and second to eighth right-eye light source signals RLS2, RLS3, ..., and RLS8 synchronized with images displayed on the second to eighth display blocks DB1, DB2, ..., and DB8, respectively, and then provides the light source signals to the second to eighth light emitting blocks LB1, LB2, ..., and LB8.

Based on a left-eye shutter signal LSS and a right-eye shutter signal RSS synchronized with an image displayed on the display panel 100, the glasses part 300 opens and closes the left-eye shutter 310 and the right-eye shutter 320. For example, the left-eye shutter signal LSS is at a high level during a period from a partial section of the first sub interval S1 to a partial section of the fifth sub interval S5 in which the left-eye image is displayed on the display panel 100, and is at a low level during a period from a partial section of the fifth sub interval S5 to a partial section of a ninth sub interval S9 in which the right-eye image is displayed on the display panel 100. The right-eye shutter signal RSS is at a low level during the period from a partial section of the first sub interval S1 to a partial section of the fifth sub interval S5, and is at a high level during the period from a partial section of the fifth sub interval S5 to a partial section of the ninth sub interval S9. Accordingly, the glasses part 300 opens the left-eye shutter 310 and closes the right-eye shutter 320 while the left-eye image is displayed on the display panel 100, and opens the right-eye shutter 320 and closes the left-eye shutter 310 while the right-eye image is displayed on the display panel 100.

Since the light source part 400 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

Figure 20:
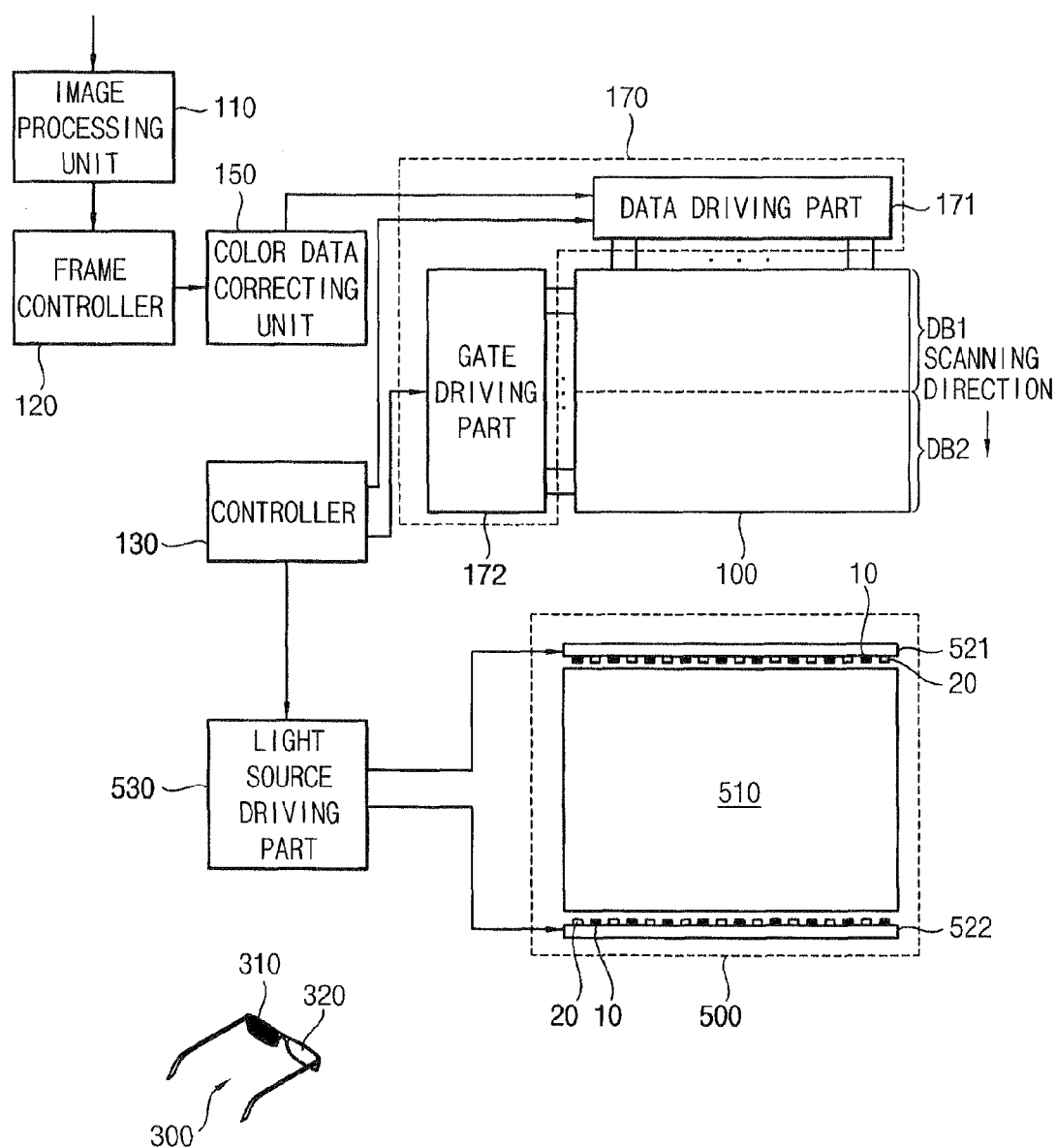
FIG. 20 is a block diagram illustrating a display apparatus according to an example embodiment.

FIG. 20 is a block diagram illustrating a display apparatus according to an example embodiment.

Referring to FIG. 20, the display apparatus includes an image processing unit 110, a frame controller 120, a controller 130, a color data correcting unit 150, a display panel 100, a panel driving part 170, a light source part 500, a light source driving part 530, and a glasses part 300.

The display apparatus is the same or substantially the same as the display apparatus shown in FIG. 1 except for the light source part 500 and the light source driving part 530.

The light source part 500 includes a light guide plate 510, a first light emitting module 521, and a second light emitting module 522. The first light emitting module 521 includes a plurality of left-eye light sources 10 and a plurality of right-eye light sources 20, and is disposed on a first side of the light guide plate 510 in a direction crossing a scanning direction of an image. The second light emitting module 522 includes a plurality of left-eye light sources 10 and a plurality of right-eye light sources 20, and is disposed on a second side facing the first side. For example, the first light emitting module 521 is disposed on a first long side of the display panel 100, and the second light emitting module 522 is disposed on a second long side of the display panel 100. According to an embodiment, the light source part 500 may include fluorescent lamps generating a left-eye light and a right-eye light.

The light source driving part 530 generates first left-eye and right-eye light source signals driving the first light emitting module 521, and generates second left-eye and right-eye light source signals driving the second light emitting module 522. For example, the display panel 100 includes first and second display blocks DB1 and DB2 corresponding to the first and second light emitting modules 521 and 522, respectively. The light source driving part 530 generates a first left-eye light source signal turning on the left-eye light source 10 of the first light emitting module 521 and a first right-eye light source signal turning off the right-eye light source 20 of the first light emitting module 521 while the left-eye image is displayed on the first display block DB1 corresponding to the first light emitting module 521. The light source driving part 530 generates a second left-eye light source signal turning on the left-eye light source 10 of the second light emitting module 522 and a second right-eye light source signal turning off the right-eye light source 20 of the first light emitting module 522 while the right-eye image is displayed on the second display block DB2 corresponding to the second light emitting module 522.

Figure 21:
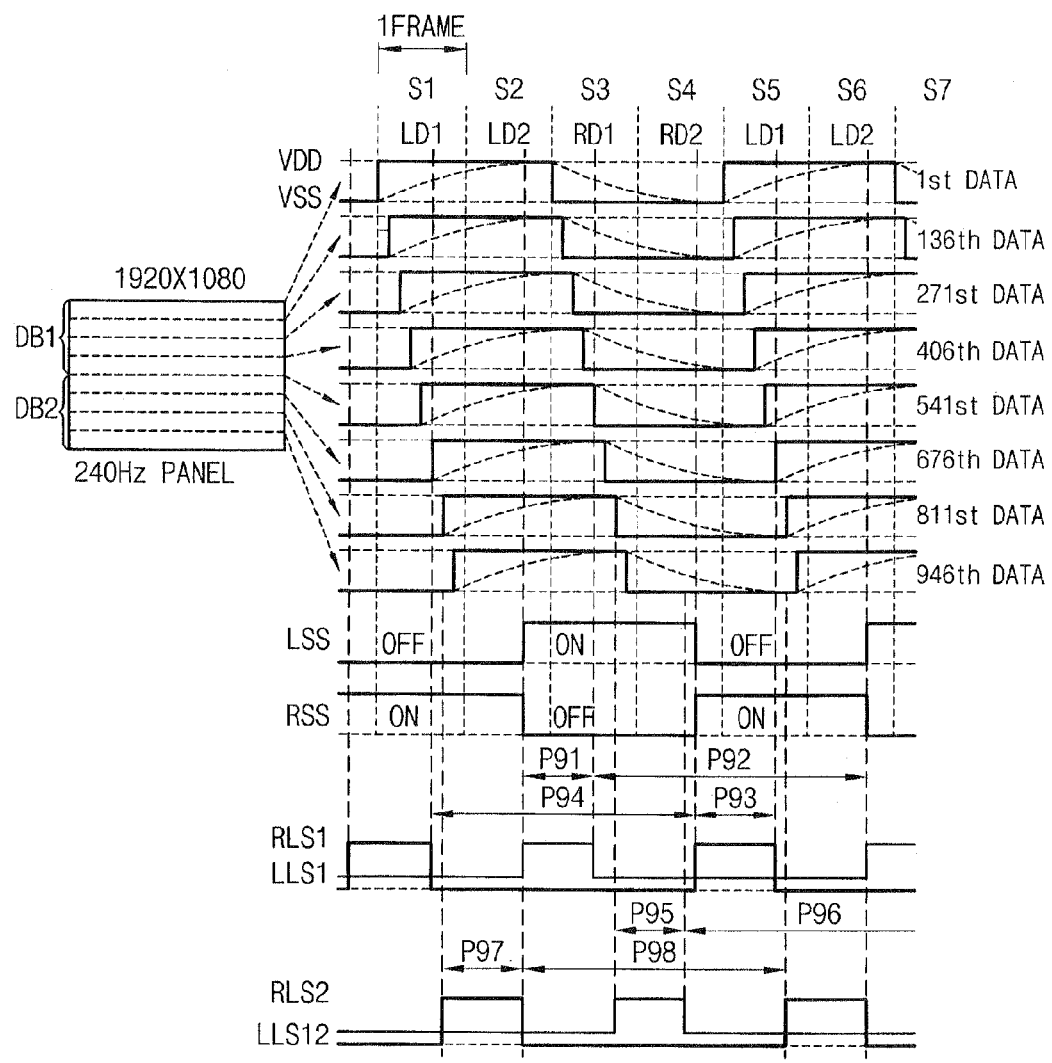
FIG. 21 is a conceptual view for describing a method of driving a display apparatus described in FIG. 20.

FIG. 21 is a conceptual view for describing a method of driving a display apparatus described in FIG. 20.

Referring to FIGS. 20 and 21, the display panel 100 may have a resolution of 1920×1080. The panel driving part 170 provides the display panel 100 with data of first and second left-eye data frames LD1 and LD2 and data of first and second right-eye data frames RD1 and RD2 that each have a frequency of 240 Hz and are corrected by the color data correcting unit 150. A sub interval in which the panel driving part 170 outputs a data frame to the display panel 100 is about 4 ms, and a main interval in which data frames LD1, LD2, RD1, and RD2 of a stereoscopic image are displayed on the display panel 100 may be about 16 ms. Therefore, the display panel 100 may be driven with a frame frequency of about 240 Hz.

In a first horizontal line included in the first display block DB1, data of the first and second left-eye data frames LD1 and LD2 are provided during first and second sub intervals S1 and S2, respectively, and data of the first and second right-eye data frames RD1 and RD2 are provided during third and fourth sub intervals S3 and S4, respectively. According to a liquid crystal response time, the first horizontal line displays the left-eye image during a period from a partial section of the second sub interval S2 to a partial section of the third sub interval S3, and displays a mixed image of left-eye and right-eye images, and right-eye image during a period from a partial section of the third sub interval S3 to a partial section of a sixth sub interval S6. The first horizontal line displays a mixed image of right-eye and left-eye images, and a left-eye image during a period from a partial section of the first sub interval S1 to a partial section of the fourth sub interval S4, and displays a right-eye image during a period from a partial section of the fourth sub interval S4 to a partial section of a fifth sub interval S5. The first display block DB1 displays the left-eye image during a first interval P91, displays the right-eye and mixed images during a second interval P92, displays the right-eye image during a third interval P93, and displays the left-eye and mixed images during a fourth interval P94.

In a 946-th horizontal line included in the second display block DB2, according to a progressive scan method, data of the first and second left-eye data frames LD1 and LD2 are provided during a period from a partial section of the first sub interval S1 to a partial section of the third sub interval S3, and data of the first and second right-eye data frames RD1 and RD2 are provided during a period from a partial section of the third sub interval S3 to a partial section of the fifth sub interval S5. According to the liquid crystal response time, the 946-th horizontal line displays the left-eye image during a period from a partial section of the third sub interval S3 to a partial section of the fourth sub interval S4, and displays a mixed image of left-eye and right-eye images, and right-eye image during a period from a partial section of the fourth sub interval S4 to a partial section of a seventh sub interval S7. The 946-th horizontal line displays a right-eye image during a period from a partial section of the first sub interval S1 to a partial section of the second sub interval S2, and displays a mixed image of right-eye and left-eye images, and a left-eye image during a period from a partial section of the second sub interval S2 to a partial section of the fifth sub interval S5. The second display block DB2 displays the left-eye image during a fifth interval P95, displays the right-eye and mixed images during a sixth interval P96, displays the right-eye image during a seventh interval P97, and displays the left-eye and mixed images during an eighth interval P98. The first to eighth intervals P91 to P98 may be set differently according to the liquid crystal response time.

In synchronization with a driving interval of the first display block DB1, the light source driving part 530 generates first left-eye and right-eye light source signals LLS1 and RLS1 to be provided to the first light emitting module 521 corresponding to the first display block DB1. The first left-eye light source signal LLS1 is at a high level during the first interval P91 in which the first display block DB1 displays the left-eye image, and is at a low level during the second interval P92 in which the first display block DB1 displays the right-eye and mixed images. The first right-eye light source signal RLS1 is at a high level during the third interval P93 in which the first display block DB1 displays the right-eye image, and is at a low level during the fourth interval P94 in which the first display block DB1 displays the left-eye and mixed images. Accordingly, based on the fifth to eighth intervals P95, P96, P97, and P98 synchronized with images displayed on the second display block DB2, the light source driving part 530 generates second left-eye and right-eye light source signals LLS2 and RLS2, and then provides the light source signals to the second light emitting module 552.

According to an example embodiment, in synchronization with images displayed on the first horizontal line of the first display block DB1, which is the closest to the first light emitting module 521, the first left-eye and right-eye light source signals to control the first light emitting module 521 are generated. Alternatively, the first left-eye and right-eye light source signals may be generated in synchronization with images displayed on any one of horizontal lines in the first display block DB1. According to an example embodiment, in synchronization with images displayed on the 946-th horizontal line of the second display block DB2, which is the closest to the second light emitting module 522, the second left-eye and right-eye light source signals to control the second light emitting module 522 are generated. Alternatively, the second left-eye and right-eye light source signals may be generated in synchronization with images displayed on any one of horizontal lines in the second display block DB2. For example, the left-eye and right-eye light source signals to control the light emitting module are generated to be synchronized with images displayed on the display block.

Based on a left-eye shutter signal LSS and a right-eye shutter signal RSS, the glasses part 300 opens and closes the left-eye shutter 310 and the right-eye shutter 320. The left-eye shutter signal LSS is at a high level during a period from a partial section of the second sub interval S2 to a partial section of the fourth sub interval S4 in which the left-eye image is displayed on the display panel 100, and is at a low level during a period from a partial section of the fourth sub interval S4 to a partial section of a sixth sub interval S6 in which the right-eye image is displayed on the display panel 100. The right-eye shutter signal RSS is at a low level during the period from a partial section of the second sub interval S2 to a partial section of the fourth sub interval S4, and is at a high level during the period from a partial section of the fourth sub interval S4 to a partial section of the sixth sub interval S6.

Since the light source part 500 provides a light to the display panel 100 only when the left-eye image or right-eye image is displayed on the display panel 100, no crosstalk is perceived between the left-eye image and the right-eye image.

Figure 22:
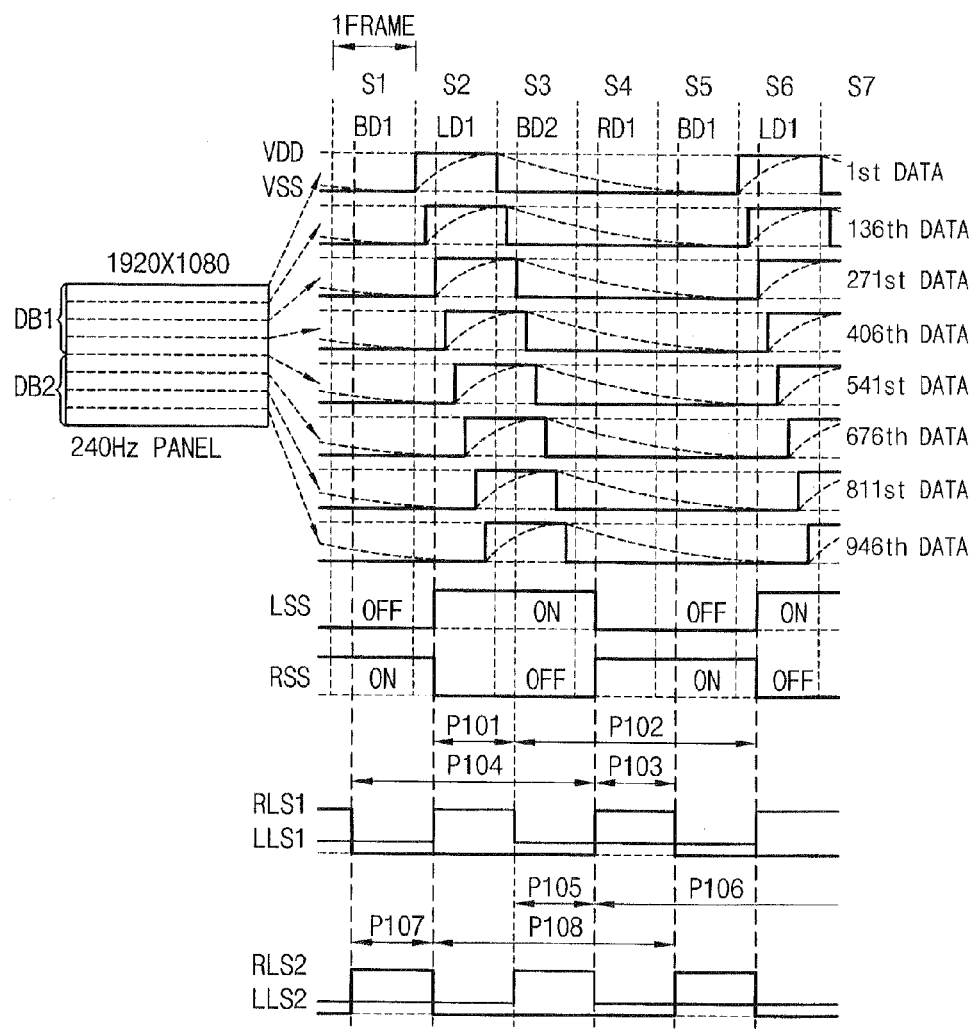
FIG. 22 is a conceptual view for describing a method of driving a display apparatus according to an example embodiment.

FIG. 22 is a conceptual view for describing a method of driving a display apparatus according to an example embodiment.

Referring to FIGS. 20 and 22, the display panel 100 may have a resolution of 1920×1080. The panel driving part 170 provides the display panel 100 with a first left-eye data frame LD1, a first black data frame BD1, a first right-eye data frame RD1, and a second black data frame BD2 using data of first and second left-eye data frames LD1 and LD2 and data of first and second right-eye data frames RD1 and RD2 that each have a frequency of 240 Hz and are corrected by the color data correcting unit 150.

In a first horizontal line included in a first display block DB1, data of the first black data frame BD1 are provided during the first sub intervals S1, data of the first left-eye data frames LD1 are provided during the second sub intervals S2, data of the second black data frame BD2 are provided during the third sub intervals S3, and data of the first right-eye data frames RD1 are provided during the fourth sub intervals S4. According to a liquid crystal response time, the first horizontal line displays the left-eye image during a period from a partial section of the second sub interval S2 to a partial section of the third sub interval S3, and displays a mixed image of left-eye and black images or a mixed image of right-eye and black images, and a right-eye image during a period from a partial section of the third sub interval S3 to a partial section of a sixth sub interval S6. The first horizontal line displays the mixed and left-eye images during a period from a partial section of the first sub interval S1 to a partial section of the fourth sub interval S4, and displays the right-eye image during a period from a partial section of the fourth sub interval S4 to a partial section of a fifth sub interval S5. The first display block DB1 displays the left-eye image during a first interval P101, displays the right-eye and mixed images during a second interval P102, displays the right-eye image during a third interval P103, and displays the left-eye and mixed images during a fourth interval P104.

In a 946-th horizontal line included in the second display block DB2, according to a progressive scan method, data of the first black and left-eye data frames BD1 and LD1 are provided during a period from a partial section of the first sub interval S1 to a partial section of the third sub interval S3, and data of the second black and first right-eye data frames BD2 and RD1 are provided during a period from a partial section of the third sub interval S3 to a partial section of the fifth sub interval S5. According to the liquid crystal response time, the 946-th horizontal line displays the left-eye image during a period from a partial section of the third sub interval S3 to a partial section of the fourth sub interval S4, and displays mixed and right-eye images during a period from a partial section of the fourth sub interval S4 to a partial section of a seventh sub interval S7. The 946-th horizontal line displays a right-eye image during a period from a partial section of the first sub interval S1 to a partial section of the second sub interval S2, and displays mixed and left-eye images during a period from a partial section of the second sub interval S2 to a partial section of the fifth sub interval S5. The second display block DB2 displays the left-eye image during a fifth interval P105, displays the right-eye and mixed images during a sixth interval P106, displays the right-eye image during a seventh interval P107, and displays the left-eye and mixed images during an eighth interval P108. The first to eighth intervals P101 to P108 may be set differently according to the liquid crystal response time.

In synchronization with a driving interval of the first display block DB1, the light source driving part 530 generates first left-eye and right-eye light source signals LLS1 and RLS1 to be provided to the first light emitting module 521 corresponding to the first display block DB1. The first left-eye light source signal LLS1 is at a high level during the first interval P101 in which the first display block DB1 displays the left-eye image, and is at a low level during the second interval P102 in which the first display block DB1 displays the right-eye and mixed images. The first right-eye light source signal RLS1 is at a high level during the third interval P103 in which the first display block DB1 displays the right-eye image, and is at a low level during the fourth interval P104 in which the first display block DB1 displays the left-eye and mixed images. Accordingly, based on the fifth to eighth intervals P105, P106, P107, and P108 synchronized with images displayed on the second display block DB2, the light source driving part 530 generates second left-eye and right-eye light source signals LLS2 and RLS2, and then provides the light source signals to the second light emitting module 552.

Based on a left-eye shutter signal LSS and a right-eye shutter signal RSS, the glasses part 300 opens and closes the left-eye shutter 310 and the right-eye shutter 320. The left-eye shutter signal LSS is at a high level during a period from a partial section of the second sub interval S2 to a partial section of the fourth sub interval S4 in which the left-eye image is displayed on the display panel 100, and is at a low level during a period from a partial section of the fourth sub interval S4 to a partial section of a sixth sub interval S6 in which the right-eye image is displayed on the display panel 100. The right-eye shutter signal RSS is at a low level during the period from a partial section of the second sub interval S2 to a partial section of the fourth sub interval S4, and is at a high level during the period from a partial section of the fourth sub interval S4 to a partial section of the sixth sub interval S6.

Since the light source part 500 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

Figure 23:
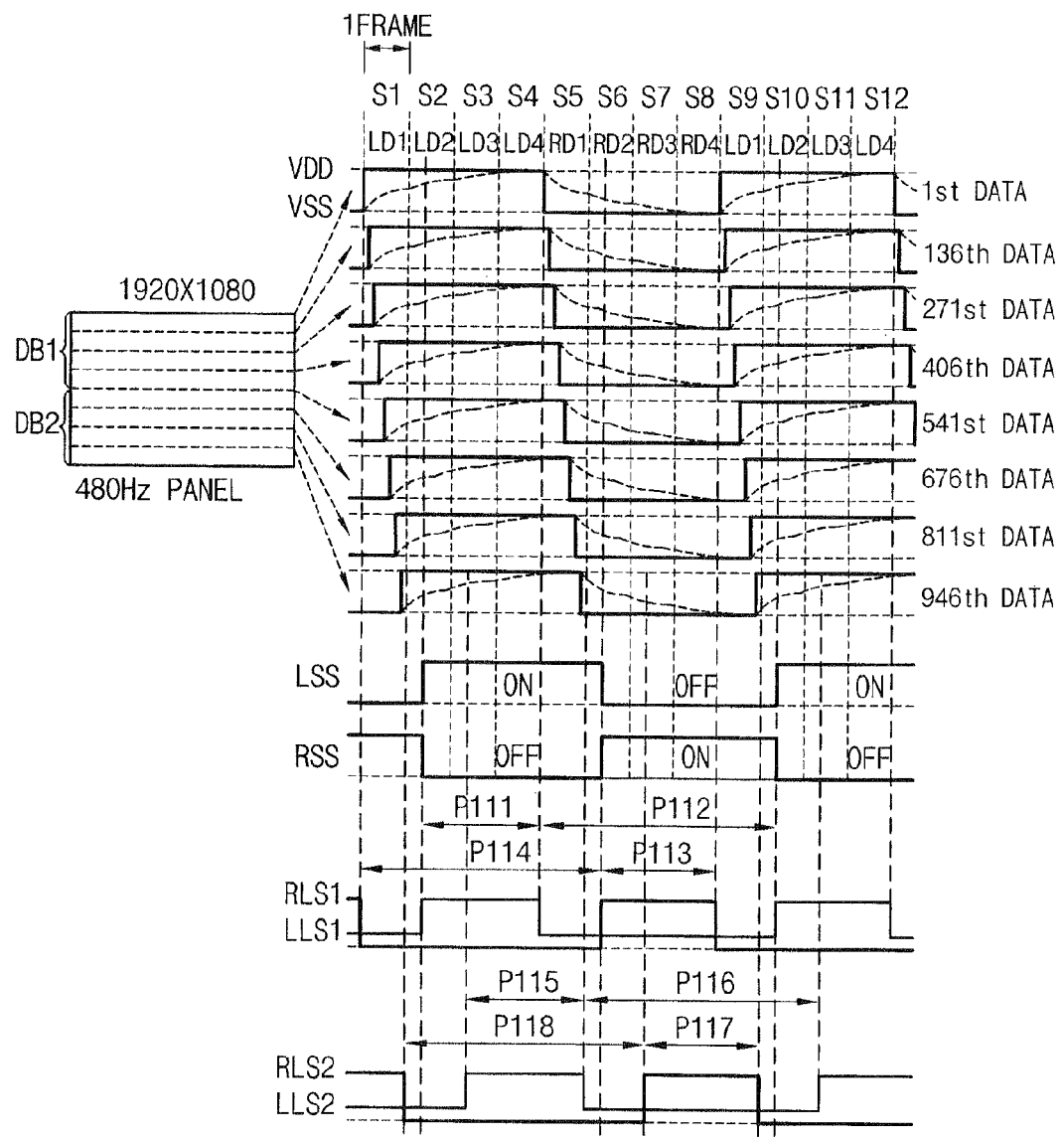
FIG. 23 is a conceptual view for describing a method of driving a display apparatus according to an example embodiment.

FIG. 23 is a conceptual view for describing a method of driving a display apparatus according to an example embodiment.

Referring to FIGS. 20 and 23, the display panel 100 may have a resolution of 1920×1080. The panel driving part 170 provides the display panel 100 with first, second, third, and fourth left-eye data frames LD1, LD2, LD3, and LD4 and first, second, third, and fourth right-eye data frames RD1, RD2, RD3, and RD4 that each have a frequency of 480 Hz and are corrected by the color data correcting unit 150. Accordingly, a sub interval in which the panel driving part 170 provides the display panel 100 with a data frame is about 2 ms, and a main interval in which data frames of a stereoscopic image LD1, LD2, LD3, LD4, RD1, RD2, RD3, and RD4 are provided to the display panel 100 may be about 16 ms.

In a first horizontal line included in the first display block, data of the first, second, third, and fourth left-eye data frames LD1, LD2, LD3, and LD4 are provided during first, second, third, and fourth sub intervals S1, S2, S3, and S4, respectively, and data of the first, second, third, and fourth right-eye data frames RD1, RD2, RD3, and RD4 are provided during fifth, sixth, seventh, and eighth sub intervals S5, S6, S7, and S8, respectively. According to a liquid crystal response time, the first horizontal line displays the left-eye image during a period from a partial section of the second sub interval S2 to a partial section of the fifth sub interval S5, and displays mixed and right-eye images during a period from a partial section of the fifth sub interval S5 to a partial section of a tenth sub interval S10. The first horizontal line displays mixed and left-eye images during a period from a partial section of the first sub interval S1 to a partial section of the sixth sub interval S6, and displays a right-eye image during a period from a partial section of the sixth sub interval S6 to a partial section of a ninth sub interval S9. The first display block DB1 displays the left-eye image during a first interval P111, displays the right-eye and mixed images during a second interval P112, displays the right-eye image during a third interval P113, and displays the left-eye and mixed images during a fourth interval P114.

In a 946-th horizontal line included in the second display block DB2, according to a progressive scan method, data of the first, second, third, and fourth left-eye data frames LD1, LD2, LD3, and LD4 are provided during a period from a partial section of the first sub interval S1 to a partial section of the fifth sub interval S5, and data of the first, second, third, and fourth right-eye data frames RD1, RD2, RD3, and RD4 are provided during a period from a partial section of the fifth sub interval S5 to a partial section of the ninth sub interval S9. According to a liquid crystal response time, the 946-th horizontal line displays the left-eye image during a period from a partial section of the third sub interval S3 to a partial section of the fifth sub interval S5, and displays mixed and right-eye images during a period from a partial section of the fifth sub interval S5 to a partial section of an eleventh sub interval S11. The 946-th horizontal line displays mixed and left-eye images during a period from a partial section of the second sub interval S2 to a partial section of the seventh sub interval S7, and displays a right-eye image during a period from a partial section of the seventh sub interval S7 to a partial section of the ninth sub interval S9. The second display block DB2 displays the left-eye image during a fifth interval P115, displays the right-eye and mixed images during a sixth interval P116, displays the right-eye image during a seventh interval P117, and displays the left-eye and mixed images during an eighth interval P118. The first to eighth intervals P111 to P118 may be set differently according to the liquid crystal response time.

In synchronization with a driving interval of the first display block DB1, the light source driving part 530 generates first left-eye and right-eye light source signals LLS1 and RLS1 to be provided to the first light emitting module 521 corresponding to the first display block DB1. The first left-eye light source signal LLS1 is at a high level during the first interval P111 in which the first display block DB1 displays the left-eye image, and is at a low level during the second interval P112 in which the first display block DB1 displays the right-eye and mixed images. The first right-eye light source signal RLS1 is at a high level during the third interval P113 in which the first display block DB1 displays the right-eye image, and is at a low level during the fourth interval P114 in which the first display block DB1 displays the left-eye and mixed images. Accordingly, based on the fifth to eighth intervals P115, P116, P117, and P118 synchronized with images displayed on the second display block DB2, the light source driving part 530 generates second left-eye and right-eye light source signals LLS2 and RLS2, and then provides the light source signals to the second light emitting module 552.

Based on a left-eye shutter signal LSS and a right-eye shutter signal RSS, the glasses part 300 opens and closes the left-eye shutter 310 and the right-eye shutter 320. The left-eye shutter signal LSS is at a high level during a period from a partial section of the second sub interval S2 to a partial section of the sixth sub interval S6 in which the left-eye image is displayed on the display panel 100, and is at a low level during a period from a partial section of the sixth sub interval S6 to a partial section of a tenth sub interval S10 in which the right-eye image is displayed on the display panel 100. The right-eye shutter signal RSS is at a low level during the period from a partial section of the second sub interval S2 to a partial section of the sixth sub interval S6, and is at a high level during the period from a partial section of the sixth sub interval S6 to a partial section of the tenth sub interval S10.

Since the light source part 500 provides a light to the display panel 100 only when the left-eye image or right-eye image is displayed on the display panel 100, no crosstalk is perceived between the left-eye image and the right-eye image.

Figure 24:
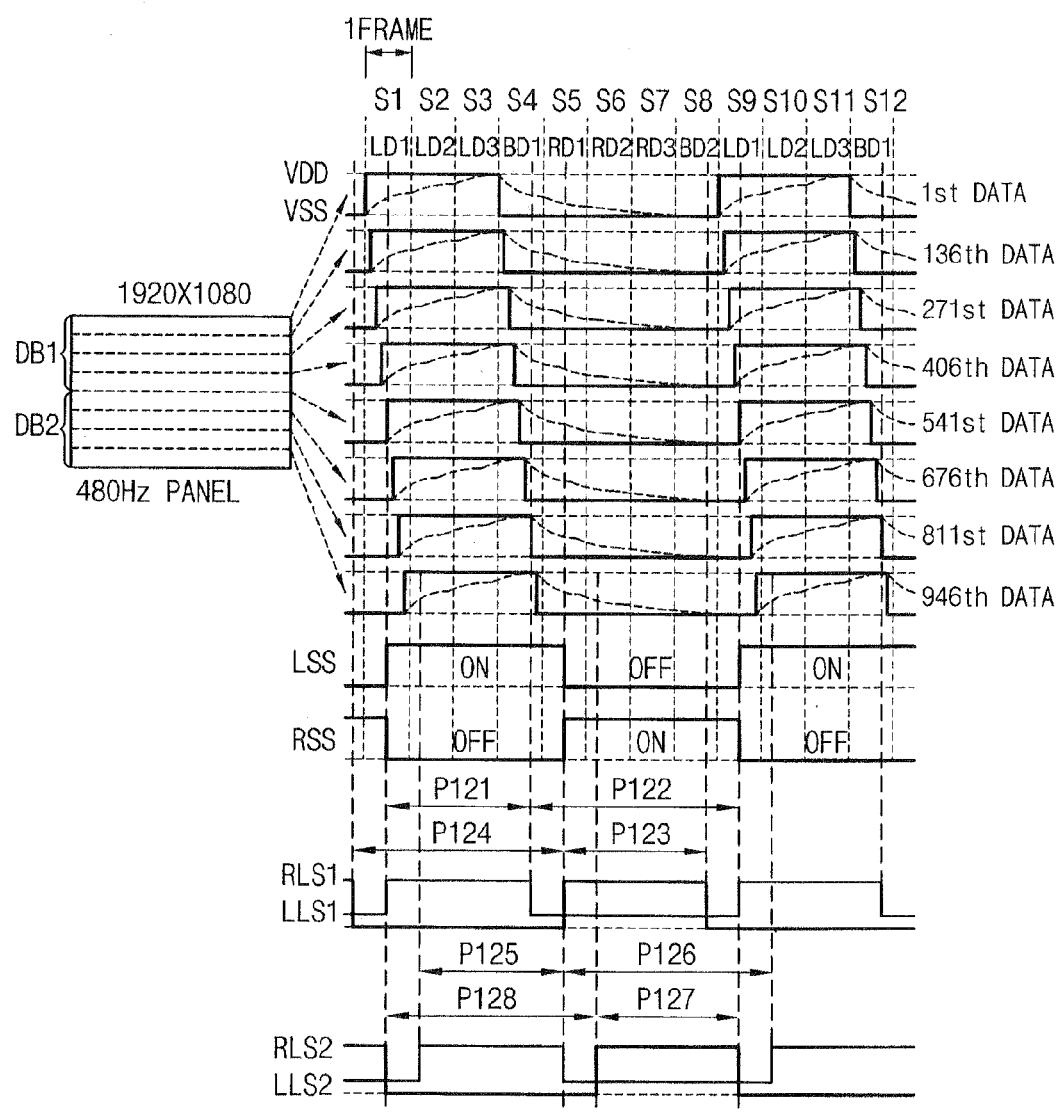
FIG. 24 is a conceptual view for describing a method of driving a display apparatus according to an example embodiment.

FIG. 24 is a conceptual view for describing a method of driving a display apparatus according to an example embodiment.

Referring to FIGS. 20 and 24, the display panel 100 may have a resolution of 1920×1080. The panel driving part 170 provides the display panel 100 with first, second, and third left-eye data frames LD1, LD2, and LD3, a first black data frame BD1, first, second, and third right-eye data frames RD1, RD2, and RD3 and a second black data frame BD2 using first, second, third, and fourth left-eye data frames LD1, LD2, LD3, and LD4 and first, second, third, and fourth right-eye data frames RD1, RD2, RD3, and RD4 that each have a frequency of 480 Hz and are corrected by the color data correcting unit 150.

In a first horizontal line included in the first display block, data of the first, second, and third left-eye data frames LD1, LD2, and LD3 are provided during first, second, and third sub intervals S1, S2, and S3, respectively, data of the black data frame BD1 is provided during the fourth sub interval S4, data of the first, second and third right-eye data frames RD1, RD2, and RD3 are provided during fifth, sixth, and seventh sub intervals S5, S6, and S7, respectively, and data of the second black data frame BD2 is provided during an eighth sub interval S8. According to a liquid crystal response time, the first horizontal line displays the left-eye image during a period from a partial section of the first sub interval S1 to a partial section of the fourth sub interval S4, and displays mixed and right-eye images during a period from a partial section of the fourth sub interval S4 to a partial section of a ninth sub interval S9. The first horizontal line displays mixed and left-eye images during a period from a partial section of the first sub interval S1 to a partial section of the fifth sub interval S5, and displays a right-eye image during a period from a partial section of the fifth sub interval S5 to a partial section of the eighth sub interval S8. The first display block DB1 displays the left-eye image during a first interval P121, displays the right-eye and mixed images during a second interval P122, displays the right-eye image during a third interval P123, and displays the left-eye and mixed images during a fourth interval P124.

In a 946-th horizontal line included in the second display block DB2, according to a progressive scan method, data of the first, second, and third left-eye data frames LD1, LD2, and LD3 and first black data frame BD1 are provided during a period from a partial section of the first sub interval S1 to a partial section of the fifth sub interval S5, and data of the first, second, and third right-eye data frames RD1, RD2, and RD3 and second black data frame BD2 are provided during a period from a partial section of the fifth sub interval S5 to a partial section of the ninth sub interval S9. According to a liquid crystal response time, the 946-th horizontal line displays the left-eye image during a period from a partial section of the second sub interval S2 to a partial section of the fifth sub interval S5, and displays mixed and right-eye images during a period from a partial section of the fifth sub interval S5 to a partial section of a tenth sub interval S10. The 946-th horizontal line displays mixed and left-eye images during a period from a partial section of the first sub interval S1 to a partial section of the sixth sub interval S6, and displays a right-eye image during a period from a partial section of the sixth sub interval S6 to a partial section of the ninth sub interval S9. The second display block DB2 displays the left-eye image during a fifth interval P125, displays the right-eye and mixed images during a sixth interval P126, displays the right-eye image during a seventh interval P127, and displays the left-eye and mixed images during an eighth interval P128. The first to eighth intervals P111 to P118 may be set differently according to the liquid crystal response time.

In synchronization with a driving interval of the first display block DB1, the light source driving part 530 generates first left-eye and right-eye light source signals LLS1 and RLS1 to be provided to the first light emitting module 521 corresponding to the first display block DB1. The first left-eye light source signal LLS1 is at a high level during the first interval P121 in which the first display block DB1 displays the left-eye image, and is at a low level during the second interval P122 in which the first display block DB1 displays the right-eye and mixed images. The first right-eye light source signal RLS1 is at a high level during the third interval P123 in which the first display block DB1 displays the right-eye image, and is at a low level during the fourth interval P124 in which the first display block DB1 displays the left-eye and mixed images. Accordingly, based on the fifth to eighth intervals P125, P126, P127, and P128 synchronized with images displayed on the second display block DB2, the light source driving part 530 generates second left-eye and right-eye light source signals LLS2 and RLS2, and then provides the light source signals to the second light emitting module 552.

Based on a left-eye shutter signal LSS and a right-eye shutter signal RSS, the glasses part 300 opens and closes the left-eye shutter 310 and the right-eye shutter 320. The left-eye shutter signal LSS is at a high level during a period from a partial section of the first sub interval S1 to a partial section of the fifth sub interval S5 in which the left-eye image is displayed on the display panel 100, and is at a low level during a period from a partial section of the fifth sub interval S5 to a partial section of a ninth sub interval S9 in which the right-eye image is displayed on the display panel 100. The right-eye shutter signal RSS is at a low level during the period from a partial section of the first sub interval S1 to a partial section of the fifth sub interval S5, and is at a high level during the period from a partial section of the fifth sub interval S5 to a partial section of the ninth sub interval S9.

Since the light source part 500 provides a light to the display panel 100 only when the left-eye image or right-eye image is displayed on the display panel 100, no crosstalk is perceived between the left-eye image and the right-eye image. The black image is inserted between the left-eye image and the right-eye image, so that luminance efficiency may be improved.

According to the example embodiments, left-eye and right-eye images are displayed using light having wavelength bands different from each other, so that a display quality of the stereoscopic image may be enhanced.

The foregoing is illustrative of the embodiments of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of displaying a stereoscopic image, the method comprising:
    displaying a left-eye image on a display panel while providing the display panel with a first light using a first light source of a light source part, the first light having a first wavelength;
    displaying a right-eye image on the display panel while providing the display panel with a second light using a second light source of the light source part, the second light having a second wavelength different from the first wavelength;
    generating color correcting data by correcting at least one of left-eye color data corresponding to the left-eye image, and right-eye color data corresponding to the right-eye image,
    wherein a first color coordinate of the first light and a second color coordinate of the second light coincide with each other with respect to a same color by moving at least one of the first color coordinate of the first light or the second color coordinate of the second light according to the generated color correcting data; and
    providing the display panel with the color correcting data,
    wherein the light source part includes a first emitting module adjacent to a first side of the display panel and a second emitting module adjacent to a second side of the display panel,
    wherein each of the first and second emitting modules includes both the first light source generating only the first light and the second light source generating only the second light,
    wherein generating the color correcting data comprises generating red, green, and blue correcting data corresponding to inputted red, green, and blue data by using red, green, and blue look-up tables, wherein each of look-up tables is stored in a memory having a (K×K×K) size and having correcting data mapped to correspond to red, green, and blue data, wherein K is a natural number smaller than a number of total grayscale values of inputted data, and
    wherein generating the color correcting data comprises outputting correcting data for the inputted red, green, and blue data by an interpolation method using correcting data stored in the look-up table when at least one of the inputted red, green, and blue data does not exist in the look-up table.

2. The method of claim 1, wherein generating the color correcting data comprises generating left-eye color correcting data by correcting the left-eye color data such that the first color coordinate moves to the second color coordinate.

3. The method of claim 1, wherein generating the color correcting data comprises generating right-eye color correcting data by correcting the right-eye color data such that the second color coordinate moves to the first color coordinate.

4. The method of claim 1, wherein generating the color correcting data comprises:
    generating left-eye color correcting data by correcting the left-eye color data such that the first color coordinate moves to a preset third color coordinate; and
    generating right-eye color correcting data by correcting the right-eye color data such that the second color coordinate moves to the third color coordinate.

5. The method of claim 1, wherein providing the display panel with the color correcting data comprises:
    providing the display panel with data of a left-eye data frame corresponding to the left-eye image; and
    providing the display panel with data of a right-eye data frame corresponding to the right-eye image.

6. The method of claim 5, providing the display panel with the color correcting data comprising:
    providing the display panel with data of a black data frame between the left-eye data frame and the right-eye data frame.

7. The method of claim 1, wherein providing the display panel with the first light and the second light comprises:
    providing the display panel with the first light when the left-eye image is displayed on the display panel and blocking the first light when images except for the left-eye image are displayed on the display panel; and
    providing the display panel with the second light when the right-eye image is displayed on the display panel and blocking the second light when images except for the right-eye image are displayed on the display panel.

8. The method of claim 1, wherein the providing the display panel with the first light and the second light comprises:
    providing a display block with the first light from the first light source when the left-eye image is displayed on the display block of the display panel, and blocking the first light when images except for the left-eye image are displayed on the display block; and
    providing the display block with the second light from the second light source when the right-eye image is displayed on the display block, and blocking the second light when images except for the right-eye image are displayed on the display block.

9. The method of claim 1, wherein the providing the display panel with the first light and the second light comprises:
    providing a first display block with the first light when the left-eye image is displayed on the first display block of the display panel adjacent to the first light emitting module and blocking the first light when images except for the left-eye image are displayed on the first display block;
    providing the first display block with the second light when the right-eye image is displayed on the first display block and blocking the second light when images except for the right-eye image are displayed on the first display block;
    providing a second display block with the first light when the left-eye image is displayed on the second display block of the display panel adjacent to the second light emitting module and blocking the first light when images except for the left-eye image are displayed on the second display block; and
    providing the second display block with the second light when the right-eye image is displayed on the second display block and blocking the second light when images except for the right-eye image are displayed on the second display block.

10. A display apparatus comprising:
a display panel displaying an image;
a light source part comprising a first emitting module adjacent to a first side of the display panel and a second emitting module adjacent to a second side of the display panel, wherein each of the first and second emitting modules includes a first light source generating only a first light having a first wavelength and a second light source generating only a second light having a second wavelength different from the first wavelength, wherein the light source part provides the display panel with the first light when a left-eye image is displayed on the display panel and the light source part provides the display panel with the second light when a right-eye image is displayed on the display panel;
a color data correcting unit generating color correcting data correcting at least one of left-eye color data corresponding to the left-eye image and right-eye color data corresponding to the right-eye image,
wherein a first color coordinate of the first light and a second color coordinate of the second light coincide with each other with respect to a same color by moving at least one of the first color coordinate of the first light or the second color coordinate of the second light according to the generated color correcting data; and
a panel driving part providing the display panel with the color correcting data wherein the color data correcting unit comprises:
a red look-up table having a (K×K×K) size, the red look-up table comprising red correcting data mapped to correspond to the inputted red, green, and blue data;
a green look-up table having a (K×K×K) size, the green look-up table comprising green correcting data mapped to correspond to the inputted red, green, and blue data; and
a blue look-up table having a (K×K×K) size, the blue look-up table comprising blue correcting data mapped to correspond to the inputted red, green, and blue data, wherein K is a natural number smaller than a number of total grayscale values of inputted data, and
wherein the color data correcting unit outputs correcting data for inputted red, green, and blue data by an interpolation method using correcting data stored in a look-up table when at least one of the inputted red, green, and blue data does not exist in the look-up table.

11. The display apparatus of claim 10, wherein the color data correcting unit comprises a left-eye color correcting unit generating left-eye color correcting data by correcting the left-eye color data such that the second color coordinate moves to the first color coordinate.

12. The display apparatus of claim 10, wherein the color data correcting unit comprises a right-eye color correcting unit generating right-eye color correcting data by correcting the right-eye color data such that the second color coordinate moves to the first color coordinate.

13. The display apparatus of claim 10, wherein the color data correcting unit comprises:
a left-eye color correcting unit generating left-eye color correcting data by correcting the left-eye color data such that the first color coordinate moves to a preset third color coordinate; and
a right-eye color correcting unit generating right-eye color correcting data by correcting the right-eye color data such that the second color coordinate moves to the preset third color coordinate.

14. The display apparatus of claim 10, wherein the light source part provides the display panel with the first light when the left-eye image is displayed on the display panel and blocks the first light when images except for the left-eye image are displayed on the display panel, and
the light source part provides the display panel with the second light when the right-eye image is displayed on the display panel and blocks the second light when images except for the right-eye image are displayed on the display panel.

15. The display apparatus of claim 10, wherein
the first light source provides a display block with the first light when the left-eye image is displayed on the display block, and blocks the first light when images except for the left-eye image are displayed on the display block, and
the second light source provides the display block with the second light when the right-eye image is displayed on the display block, and blocks the second light when images except for the right-eye image are displayed on the display block.

16. The display apparatus of claim 10, wherein the first light is provided to a first display block of the display panel when the left-eye image is displayed on the first display block adjacent to the first light emitting module, and the first light is blocked when images except for the left-eye image are displayed on the first display block, wherein
the first light emitting module provides the first display block with the second light when the right-eye image is displayed on the first display block and blocks the second light when images except for the right-eye image is displayed on the first display block, and
the first light is provided to a second display block of the display panel when the left-eye image is displayed on the second display block adjacent to the second light emitting module, and the first light is blocked when images except for the left-eye image are displayed on the second display block, wherein
the second light emitting module provides the second display block with the second light when the right-eye image is displayed on the second display block and blocks the second light when images except for the right-eye image is displayed on the second display block.

17. A method of displaying a stereoscopic image, the method comprising:
providing a display panel with first and second lights respectively depending on left-eye and right-eye images displayed on the display panel, using a light source part, wherein the first and second light have different wavelengths;
correcting left-eye color data or right-eye color data to move a color coordinate of the first light or the second light and to have the same color coordinate, wherein the left-eye and right-eye color data correspond to the left-eye and right-eye images, respectively; and
providing the display panel with the corrected color data,
wherein the light source part includes a first emitting module adjacent to a first side of the display panel and a second emitting module adjacent to a second side of the display panel,
wherein each of the first and second emitting modules includes a first light source generating only the first light and a second light source generating only the second light,
wherein correcting left-eye color data or right-eye color data comprises generating red, green, and blue correcting data corresponding to inputted red, green, and blue data by using red, green, and blue look-up tables, wherein each of look-up tables is stored in a memory having a (K×K×K) size and having correcting data mapped to correspond to red, green, and blue data, wherein K is a natural number smaller than a number of total grayscale values of inputted data, and wherein correcting left-eye color data or right-eye color data comprises outputting correcting data for the inputted red, green, and blue data by an interpolation method using correcting data stored in the look-up table when at least one of the inputted red, green, and blue data does not exist in the look-up table.

18. The method of claim 17, further comprising:

adjusting opening and closing of glasses in synchronization with the provision of the corrected color data.

* * * * *